United States Patent
Smith et al.

(10) Patent No.: US 11,654,917 B2
(45) Date of Patent: *May 23, 2023

(54) CONTROL OF AUTONOMOUS VEHICLE BASED ON DETERMINED YAW PARAMETER(S) OF ADDITIONAL VEHICLE

(71) Applicant: Aurora Innovation, Inc., Palo Alto, CA (US)

(72) Inventors: Warren Smith, McKees Rocks, PA (US); Ethan Eade, Pittsburgh, PA (US); Sterling J. Anderson, Sunnyvale, CA (US); James Andrew Bagnell, Pittsburgh, PA (US); Bartholomeus C. Nabbe, Palo Alto, CA (US); Christopher Paul Urmson, Los Altos, CA (US)

(73) Assignee: AURORA OPERATIONS, INC., Mountain View, CA (US)

(*) Notice: Subject to any disclaimer, the term of this patent is extended or adjusted under 35 U.S.C. 154(b) by 199 days.

This patent is subject to a terminal disclaimer.

(21) Appl. No.: 17/135,171

(22) Filed: Dec. 28, 2020

(65) Prior Publication Data
US 2021/0146932 A1 May 20, 2021

Related U.S. Application Data

(63) Continuation of application No. 16/173,660, filed on Oct. 29, 2018, now Pat. No. 10,906,536.
(Continued)

(51) Int. Cl.
*B60W 40/04* (2006.01)
*B60W 30/095* (2012.01)
(Continued)

(52) U.S. Cl.
CPC ........ *B60W 40/04* (2013.01); *B60W 30/0956* (2013.01); *G01S 17/89* (2013.01);
(Continued)

(58) Field of Classification Search
CPC ..... B60W 2420/52; B60W 2554/4041; B60W 2554/803; B60W 2754/00;
(Continued)

(56) References Cited

U.S. PATENT DOCUMENTS 3,987,297 A 10/1976 Brienza et al.
6,175,799 B1 * 1/2001 Tsutsumi ........ B60W 30/18145
340/904
(Continued)

FOREIGN PATENT DOCUMENTS

CN 112041702 12/2020
EP 1298454 A2 * 4/2003 ............. G01S 17/66
(Continued)

OTHER PUBLICATIONS

Khuon, Timothy et al.: "Distributed adaptive spectral and spatial sensor fusion for super-resolution classification", Applied Imagery Pattern Recognition Workshop (AIPR), 2012 IEEE, IEEE, Oct. 9, 2012 (Oct. 9, 2012), pp. 1-8, XP032422650.
(Continued)

*Primary Examiner* — Babar Sarwar
(74) *Attorney, Agent, or Firm* — Gray Ice Higdon

(57) ABSTRACT

Determining yaw parameter(s) (e.g., at least one yaw rate) of an additional vehicle that is in addition to a vehicle being autonomously controlled, and adapting autonomous control of the vehicle based on the determined yaw parameter(s) of the additional vehicle. For example, autonomous steering, acceleration, and/or deceleration of the vehicle can be adapted based on a determined yaw rate of the additional vehicle. In many implementations, the yaw parameter(s) of
(Continued)

the additional vehicle are determined based on data from a phase coherent Light Detection and Ranging (LIDAR) component of the vehicle, such as a phase coherent LIDAR monopulse component and/or a frequency-modulated continuous wave (FMCW) LIDAR component.

20 Claims, 12 Drawing Sheets

Related U.S. Application Data

(60) Provisional application No. 62/655,965, filed on Apr. 11, 2018.

(51) Int. Cl.
| | |
|---|---|
| G05D 1/02 | (2020.01) |
| G05D 1/00 | (2006.01) |
| G06N 20/00 | (2019.01) |
| G01S 17/931 | (2020.01) |
| G01S 17/89 | (2020.01) |
| G06F 18/214 | (2023.01) |
| G06F 18/21 | (2023.01) |

(52) U.S. Cl.
CPC .......... *G01S 17/931* (2020.01); *G05D 1/0088* (2013.01); *G05D 1/024* (2013.01); *G06F 18/214* (2023.01); *G06F 18/2178* (2023.01); *G06N 20/00* (2019.01); *B60W 2554/4041* (2020.02); *B60W 2554/803* (2020.02)

(58) Field of Classification Search
CPC ... B60W 30/0956; B60W 40/04; G01S 17/34; G01S 17/42; G01S 17/58; G01S 17/86; G01S 17/89; G01S 17/931; G01S 7/4808; G05D 1/0088; G05D 1/024; G06K 9/6256; G06K 9/6263; G06N 20/00; G06N 3/0454; G06N 3/084
See application file for complete search history.

(56) References Cited

U.S. PATENT DOCUMENTS

| | | | |
|---|---|---|---|
| 9,020,680 B2 * | 4/2015 | Solyom | B62D 15/02 |
| | | | 701/23 |
| 9,606,539 B1 | 3/2017 | Kentley et al. | |
| 9,734,455 B2 | 8/2017 | Levinson et al. | |
| 9,940,834 B1 | 4/2018 | Konrardy et al. | |
| 10,007,269 B1 | 6/2018 | Gray | |
| 10,676,085 B2 | 6/2020 | Smith et al. | |
| 10,906,536 B2 | 2/2021 | Smith et al. | |
| 10,915,101 B2 | 2/2021 | Cohen | |
| 11,086,319 B2 | 8/2021 | Valois | |
| 2010/0052945 A1 | 3/2010 | Breed | |
| 2010/0198513 A1 * | 8/2010 | Zeng | G01S 17/89 |
| | | | 701/300 |
| 2013/0190982 A1 * | 7/2013 | Nakano | B62D 15/025 |
| | | | 701/41 |
| 2014/0324266 A1 * | 10/2014 | Zhu | G01S 13/865 |
| | | | 382/104 |
| 2014/0350768 A1 | 11/2014 | Filippov et al. | |
| 2014/0368493 A1 * | 12/2014 | Rogan | G06T 11/60 |
| | | | 345/419 |
| 2015/0112550 A1 * | 4/2015 | Cho | B60G 17/0162 |
| | | | 701/38 |
| 2015/0293216 A1 * | 10/2015 | O'Dea | B60W 40/06 |
| | | | 701/23 |
| 2016/0299228 A1 | 10/2016 | Maleki | |
| 2017/0076227 A1 | 3/2017 | Elgie et al. | |
| 2017/0123419 A1 * | 5/2017 | Levinson | G01S 7/4972 |
| 2017/0270361 A1 | 9/2017 | Puttagunta et al. | |
| 2018/0053102 A1 | 2/2018 | Martinson et al. | |
| 2018/0060725 A1 | 3/2018 | Groh et al. | |
| 2018/0089538 A1 | 3/2018 | Graham et al. | |
| 2018/0136644 A1 | 5/2018 | Levinson et al. | |
| 2018/0188037 A1 | 7/2018 | Wheeler et al. | |
| 2018/0260628 A1 | 9/2018 | Namiki et al. | |
| 2018/0307944 A1 | 10/2018 | Li et al. | |
| 2019/0012907 A1 * | 1/2019 | Itahara | G08G 1/0112 |
| 2019/0106113 A1 * | 4/2019 | Kato | B60W 40/114 |
| 2019/0120967 A1 | 4/2019 | Smits | |
| 2019/0164049 A1 | 5/2019 | Bai et al. | |
| 2019/0180451 A1 * | 6/2019 | Kellner | G06T 7/285 |
| 2019/0302269 A1 | 10/2019 | Singer et al. | |
| 2019/0315351 A1 | 10/2019 | Smith et al. | |
| 2019/0317217 A1 | 10/2019 | Day et al. | |
| 2019/0317219 A1 | 10/2019 | Smith et al. | |
| 2019/0318206 A1 * | 10/2019 | Smith | G01S 17/42 |
| 2020/0142408 A1 * | 5/2020 | Valois | G06N 20/00 |
| 2020/0142409 A1 | 5/2020 | Valois et al. | |
| 2020/0142422 A1 | 5/2020 | Valois et al. | |
| 2020/0209867 A1 | 7/2020 | Valois et al. | |
| 2020/0210777 A1 | 7/2020 | Valois et al. | |
| 2020/0391736 A1 | 12/2020 | Smith et al. | |

FOREIGN PATENT DOCUMENTS

| | | | | |
|---|---|---|---|---|
| EP | 1298454 A2 | 4/2003 | | |
| EP | 1531343 A1 | 5/2005 | | |
| EP | 3285230 A1 | 2/2018 | | |
| EP | 3285230 A1 * | 2/2018 | .......... | G01S 13/589 |
| EP | 3477616 A1 | 5/2019 | | |
| KR | 1020160093465 | 8/2016 | | |
| WO | WO-8500784 A * | 2/1985 | .......... | B60K 28/066 |
| WO | 2014168851 | 10/2014 | | |
| WO | 20170013750 | 1/2017 | | |
| WO | 20170158768 | 9/2017 | | |
| WO | 2018055378 | 3/2018 | | |
| WO | 2019199473 | 10/2019 | | |
| WO | 2019199474 | 10/2019 | | |
| WO | 2019199475 | 10/2019 | | |
| WO | 2020091833 | 5/2020 | | |
| WO | 2020091834 | 5/2020 | | |
| WO | 2020091835 | 5/2020 | | |

OTHER PUBLICATIONS

Chinese Application No. 201980024172.3 entered national stage Sep. 30, 2020.
Chinese Application No. 201980024410.0 entered national stage Sep. 30, 2020.
Korean Patent App. No. 10-2020-7031846 entered national stage Nov. 4, 2020.
Korean Patent App. No. 10-2020-7031853 entered national stage Nov. 4, 2020.
European Patent App. No. 19744897.0 entered national stage Nov. 9, 2020.
European Patent App. No. 19722966.9 entered national stage Nov. 9, 2020.
Japanese Patent App. No. 2020-555890 entered national stage Oct. 7, 2020.
Korean Intellectual Property Office, Notice of Preliminary Rejection in app. No. 10-2020-7031853 dated Feb. 21, 2022.
United States Patent and Trademark Office, Office Action for U.S. Appl. No. 16/173,669 dated Jan. 14, 2020.
United States Patent and Trademark Office, Notice of Allowance for U.S. Appl. No. 16/173,669 dated Mar. 25, 2020.
Dresner, et al.; A Multiagent Approach to Autonomous Intersection Management, Journal of Artificial Intelligence Research 31 (2008) 591-656, Mar. 2008.
Cortica Automotive; It's Not Enough to Recognize a Traffic Light 99% of the Time, http://www.cortica.com/automotive/index.html, Jun. 5, 2018.
Bojarski, et al.; End to End Learning for Self-Driving Cars, Apr. 25, 2016.
Michels, Jeff, et al.; High Speed Obstacle Avoidance using Monocular Vision and Reinforcement Learning, Computer Science

(56) References Cited

OTHER PUBLICATIONS

Department, Stanford University, Proceedings of the 22nd International Conference on Machine Learning, Bonn, Germany, 2005.
Dresner, Kurt, et al.; Stone P. (2006) Multiagent Traffic Management: Opportunities for Multiagent Learning. In: Tuyls K., Hoen P.J., Verbeeck K., Sen S. (eds) Learning and Adaption in Multi-Agent Systems. LAMAS 2005. Lecture Notes in Computer Science, vol. 3898. Springer, Berlin, Heidelberg.
Pongpunwattana, Anawat, et al.; (2004). Real-Time Planning for Multiple Autonomous Vehicles in Dynamic Uncertain Environments. Journal of Aerospace Computing Information and Communication—J Aerosp Comput Inf Commun. 1. 580-604. 10.2514/1. 12919.
Roderick, Norman, et al. (2002); Reinforcement Learning for Autonomous Vehicles.
Desjardins, C. et al.; Cooperative Adaptive Cruise Control: A Reinforcement Learning Approach; IEEEE, vol. 12, No. 4; pp. 1248-1260; dated Dec. 2011.
Ye, H. et al.: Machine LEarning for Vehicular Networks: Recent Advances and Application Examples; IEEE, vol. 13, No. 2; pp. 94-101; dated Jun. 1, 2018.
European Patent Office, International Search Report and Written Opinion for PCT/US2019/024672, 11 pages dated Jul. 23, 2019.
Barth, Alexander et al.; Where Will the Oncoming Vehicle be the Next Second? 2008 IEEE Intelligent Vehicles Symposium, Eindhoven University of Technology, Eindhoven, The Netherlands, Jun. 4-6, 2008, 6 pages, Downloaded on Jun. 18, 2010.
Carlson, Christopher R., et al.; Practical Position and Yaw Rate Estimation with GPS and Differential Wheelspeeds, Mechanical Engineering, Standford, CA, 8 pages, Oct. 30, 2014.
Kellner, Dominik, et al.; Instantaneous Full-Motion Estimation of Arbitrary Objects using Dual Doppler Radar, driveU, Institute of Measurement, Control and Microtechnology Ulm, Germany, 6 pages, Jun. 29, 2016.
Kellner, Dominik, et al.; Tracking of Extended Objects with High-Resolution Doppler Radar, driveU, Institute of Measurement, Control and Microtechnology Ulm, Germany, 13 pages, Nov. 23, 2015.
Mukhtar, Amir, et al.; Vehicle Detection Techniques for Collision Avoidance Systems: A Review, IEEE Transactions on Intelligent Transportation Systems, vol. 16, No. 5, 21 pages, Oct. 2015.
International Searching Authority; International Search Report and Written Opinion for PCT/US2019/024675, 10 pages, dated Oct. 21, 2019.
United States Patent and Trademark Office, Notice of Allowance for U.S. Appl. No. 16/173,660 dated Oct. 15, 2020.
United States Patent and Trademark Office, Office Action for U.S. Appl. No. 16/271,401 dated Nov. 27, 2020.
United States Patent and Trademark Office, Notice of Allowance for U.S. Appl. No. 16/173,660 dated Nov. 27, 2020.
Japanese Intellectual Property Office, Notice of Reasons For Rejection in App. No 2020-555890 dated Jun. 21, 2022; 11 pages.
United States Patent and Trademark Office, Non-Final Office Action for U.S. Appl. No. 16/173,648 dated May 11, 2022; 62 pages.
United States Patent and Trademark Office, Notice of Allowance for U.S. Appl. No. 16/173,648 dated Aug. 17, 2022; 21 pages.
Korean Intellectual Property Office, Notice of Grounds of Rejection issued in App. No. 10-2020-7031846 dated Apr. 8, 2022; 24 pages.
European Patent Office, Examination Report in App. 19744897.0 dated Aug. 11, 2022; 6 pages.

\* cited by examiner

CONTROL OF AUTONOMOUS VEHICLE BASED ON DETERMINED YAW PARAMETER(S) OF ADDITIONAL VEHICLE

BACKGROUND

As computing and vehicular technologies continue to evolve, autonomy-related features have become more powerful and widely available, and capable of controlling vehicles in a wider variety of circumstances. For automobiles, for example, the Society of Automotive Engineers (SAE) has established a standard (J3016) that identifies six levels of driving automation from "no automation" to "full automation". The SAE standard defines Level 0 as "no automation" with full-time performance by the human driver of all aspects of the dynamic driving task, even when enhanced by warning or intervention systems. Level 1 is defined as "driver assistance", where a vehicle controls steering or acceleration/deceleration (but not both) in at least some driving modes, leaving the operator to perform all remaining aspects of the dynamic driving task. Level 2 is defined as "partial automation", where the vehicle controls steering and acceleration/deceleration in at least some driving modes, leaving the operator to perform all remaining aspects of the dynamic driving task. Level 3 is defined as "conditional automation", where, for at least some driving modes, the automated driving system performs all aspects of the dynamic driving task, with the expectation that the human driver will respond appropriately to a request to intervene. Level 4 is defined as "high automation", where, for only certain conditions, the automated driving system performs all aspects of the dynamic driving task even if a human driver does not respond appropriately to a request to intervene. The certain conditions for Level 4 can be, for example, certain types of roads (e.g., highways) and/or certain geographic areas (e.g., a geofenced metropolitan area which has been adequately mapped). Finally, Level 5 is defined as "full automation", where a vehicle is capable of operating without operator input under all conditions.

A fundamental challenge of any autonomy-related technology relates to collecting and interpreting information about a vehicle's surrounding environment, along with planning and executing commands to appropriately control vehicle motion to safely navigate the vehicle through its current environment. Therefore, continuing efforts are being made to improve each of these aspects, and by doing so, autonomous vehicles increasingly are able to reliably operate in increasingly complex environments and accommodate both expected and unexpected interactions within an environment.

SUMMARY

In some implementations, a method of adapting autonomous control of an autonomous vehicle based on a determined yaw parameter of an additional vehicle is provided. The method includes receiving, from a phase coherent Light Detection and Ranging (LIDAR) component of a vehicle, a group of phase coherent LIDAR data points of a sensing cycle of the phase coherent LIDAR component. Each of the phase coherent LIDAR data points of the group indicates a corresponding range and a corresponding velocity for a corresponding point in the environment, and each of the phase coherent LIDAR data points of the group is generated based on a corresponding sensing event of the phase coherent LIDAR component during the sensing cycle. The method further includes determining that a subgroup, of the phase coherent LIDAR data points of the group, corresponds to an additional vehicle that is in addition to the vehicle. The method further includes, based on determining that the subgroup corresponds to the additional vehicle, determining a yaw parameter of the additional vehicle based on a plurality of the phase coherent LIDAR data points of the subgroup. The method further includes adapting autonomous control of the vehicle based on the determined yaw parameter of the additional vehicle.

These and other implementations of the technology described herein can include one or more of the following features.

In some implementations, determining that the subgroup of the phase coherent LIDAR data points of the group corresponds to the additional vehicle includes: processing the phase coherent LIDAR data points of the group using a trained machine learning model; generating, based on processing of the phase coherent LIDAR data points of the group using the trained machine learning model, an output that indicates that the subgroup has a vehicle classification; and determining that the subgroup corresponds to the additional vehicle based on the output indicating that the subgroup has the vehicle classification.

In some implementations, determining the yaw parameter of the additional vehicle based on the plurality of the phase coherent LIDAR data points of the subgroup includes: determining a first set of one or more of the plurality of phase coherent LIDAR data points of the subgroup; determining a second set of one or more of the plurality of phase coherent LIDAR data points of the subgroup based on the second set being spatially offset from the first set; and determining the yaw parameter based on comparison of the first set to the second set. In some versions of those implementations, determining that the first set and the second set are spatially offset relative to one another is based at least in part on the corresponding ranges indicated by the first set and the second set. In some additional or alternative versions of those implementations, determining the yaw parameter of the additional vehicle based on comparison of the first set to the second set includes: determining the yaw parameter based on comparison of a first set velocity magnitude of the first set and a second set velocity magnitude of the second set. The first set velocity magnitude is based on the corresponding velocities for the first set, and the second set velocity magnitude is based on the corresponding velocities for the second set. In various implementations, the yaw parameter of the additional vehicle can include a yaw rate of the additional vehicle, and determining the yaw parameter of the additional vehicle based on comparison of the first set to the second set can further include: determining a distance based on the spatial offset between the first set and the second set; and determining the yaw rate based on: the comparison of the first set velocity magnitude and the second set velocity magnitude, and the distance. Determining the yaw rate based on the comparison of the first set velocity magnitude and the second set velocity magnitude, and the distance can include: determining a velocity differential between the first set velocity magnitude and the second set velocity magnitude based on the comparison of the first set velocity magnitude and the second set velocity magnitude; and converting the velocity differential to the yaw rate based on the distance. In various implementations, the yaw parameter of the additional vehicle can include a lower bound yaw rate of the additional vehicle, and the method can further include determining an additional yaw parameter of the additional vehicle, that is an upper bound yaw rate and that is determined based on comparison of the first set to the second set. For example, the method can further include determining a velocity differential between the first set velocity magnitude and the second set velocity magnitude based on the comparison of the first set velocity magnitude and the second set velocity magnitude, and determining the lower bound yaw rate can include dividing the velocity differential by the distance, and determining the upper bound yaw rate can include dividing the velocity differential by a value that is based on the distance, but that is reduced in magnitude relative to the distance. In various implementations that determine a first set and a second set of the phase coherent LIDAR data points, the first set includes multiple of the plurality of phase coherent LIDAR data points and the first set velocity magnitude is determined based on the corresponding velocities for the multiple of the plurality of phase coherent LIDAR data points. For example, the first set velocity magnitude can be based on an average of the corresponding velocities for the multiple of the plurality of phase coherent LIDAR data points. In various implementations where the yaw parameter includes a yaw rate, and where determining the yaw parameter of the additional vehicle is based on comparison of the first set to the second set, determining the yaw parameter includes: determining a velocity differential based on comparison of a first set velocity magnitude and a second set velocity magnitude; identifying a stored model for the additional vehicle; and converting the velocity differential to the yaw rate based on the stored model for the additional vehicle. The first set velocity magnitude can be based on the corresponding velocities for the first set, and the second set velocity magnitude can be based on the corresponding velocities for the second set. In some of those various implementations, identifying the stored model for the additional vehicle includes selecting the stored model, from a plurality of candidate stored models, based on the phase coherent LIDAR data points of the subgroup In some implementations, the yaw parameter includes a yaw rate and a yaw direction. In some of those implementations, determining the yaw parameter of the additional vehicle based on the plurality of the phase coherent LIDAR data points of the subgroup includes: processing the plurality of the phase coherent LIDAR data points of the subgroup using a trained machine learning model; generating, based on processing of the phase coherent LIDAR data points of the group using the trained machine learning model, an output that indicates that the yaw rate; and determining the yaw rate and the yaw direction based on the output. In some versions of those implementations, processing the plurality of the phase coherent LIDAR data points of the subgroup using the trained machine learning model includes processing all of the phase coherent LIDAR data points of the subgroup using the trained machine learning model.

In some implementations, the yaw parameter of the additional vehicle is a velocity differential that is indicative of yaw rate. In some of those implementations, adapting autonomous control of the vehicle based on the determined yaw parameter of the additional vehicle includes adapting the autonomous control based on the velocity differential exceeding a threshold.

In some implementations, adapting autonomous control of the vehicle based on the determined yaw parameter of the additional vehicle includes altering a velocity of the vehicle and/or a direction of the vehicle. In some of those implementations, the yaw parameter is yaw rate and adapting autonomous control of the vehicle based on the determined yaw rate of the additional vehicle is in response to determining that the determined yaw rate satisfies a threshold.

In some implementations, adapting autonomous control of the vehicle based on the determined yaw parameter of the additional vehicle includes: determining at least one candidate trajectory of the additional vehicle based on the determined yaw parameter; and adapting autonomous control of the vehicle based on the at least one candidate trajectory.

In some implementations the group of phase coherent LIDAR data points includes a three-dimensional point cloud.

In some implementations, the phase coherent LIDAR component is a phase coherent LIDAR monopulse component. In some of those implementations, the corresponding sensing events of the phase coherent LIDAR component each include a first receiver sensing event at a first receiver of the phase coherent LIDAR monopulse component and a second receiver sensing event at a second receiver of the phase coherent LIDAR monopulse component. In some versions of those implementations, the corresponding sensing events of the phase coherent LIDAR component further include a third receiver sensing event at a third receiver of the phase coherent LIDAR monopulse component.

In some implementations, the phase coherent LIDAR component is a frequency-modulated continuous wave (FMCW) LIDAR component.

In some implementations, a method of adapting autonomous control of an autonomous vehicle based on a determined yaw rate of an additional vehicle is provided and includes receiving, from a phase coherent LIDAR component of a vehicle, phase coherent LIDAR data capturing an environment of the vehicle. The phase coherent LIDAR data indicates, for each of a plurality of points in the environment of the vehicle, at least one corresponding range and at least one corresponding velocity based on a corresponding sensing event of the phase coherent LIDAR component. The method further includes determining that a subgroup of the phase coherent LIDAR data corresponds to an additional vehicle that is in the environment and that is in addition to the vehicle. The method further includes determining a yaw rate of the additional vehicle and adapting autonomous control of the vehicle based on the determined yaw rate of the additional vehicle. Determining the yaw rate of the additional vehicle is based on multiple corresponding velocities indicated by the phase coherent LIDAR data of the subgroup.

These and other implementations of the technology described herein can include one or more of the following features.

In some implementations, determining that the subgroup of the phase coherent LIDAR data corresponds to the additional vehicle includes: processing the phase coherent LIDAR data using a trained machine learning model; generating, based on processing of the phase coherent LIDAR data using the trained machine learning model, an output that indicates that the subgroup has a vehicle classification; and selecting the subgroup based on the output indicating that the subgroup has the vehicle classification.

In some implementations, determining the yaw rate of the additional vehicle includes determining a velocity gradient based on the multiple corresponding velocities indicated by the phase coherent LIDAR data of the subgroup, and determining the yaw rate based on the velocity gradient.

In some implementations, adapting autonomous control of the vehicle based on the determined yaw rate of the additional vehicle includes altering one or both of a velocity of the vehicle, and a direction of the vehicle.

In some implementations, the phase coherent LIDAR data includes: a range-Doppler image, a three-dimensional point cloud, and/or an intermediate frequency waveform. The intermediate frequency waveform can be generated based on mixing of a local optical oscillator with time delayed reflections during the corresponding sensing events.

In some implementations, the phase coherent LIDAR component is a phase coherent LIDAR monopulse component including at least a first coherent receiver and a second coherent receiver. In some of those implementations, the corresponding sensing events of the phase coherent LIDAR component each include a first receiver sensing event at the first coherent receiver of the phase coherent LIDAR monopulse component and a second receiver sensing event at the second coherent receiver of the phase coherent LIDAR monopulse component (and optionally further receiver sensing event(s) at further receiver(s)).

In some implementations, the phase coherent LIDAR component is an FMCW LIDAR component.

In some implementations, a method of adapting autonomous control of an autonomous vehicle based on a determined yaw parameter of an additional vehicle is provided and includes receiving, from a phase coherent LIDAR monopulse component of a vehicle, phase coherent LIDAR monopulse data capturing an environment of the vehicle. The phase coherent LIDAR monopulse component includes a laser source and at least a first coherent receiver and a second coherent receiver. The phase coherent LIDAR monopulse data indicates, for each of a plurality of points in the environment of the vehicle, at least one corresponding range and at least one corresponding velocity based on a corresponding sensing event of the phase coherent LIDAR monopulse component. The corresponding sensing events of the phase coherent LIDAR component each include a first receiver sensing event by the first receiver and a second receiver sensing event by the second receiver. The method further includes determining, based on multiple of the corresponding velocities indicated by the phase coherent LIDAR monopulse data, a yaw parameter of an additional vehicle in the environment of the vehicle. The method further includes adapting autonomous control of the vehicle based on the determined yaw parameter of the additional vehicle.

These and other implementations of the technology described herein can include one or more of the following features.

In some implementations, determining the yaw parameter of the additional vehicle based on the phase coherent LIDAR monopulse data includes: determining a first set of the phase coherent LIDAR monopulse data; determining a second set of the phase coherent LIDAR monopulse data based on the second set being spatially offset from the first set; and determining the yaw parameter based on a first set velocity and a second set velocity. The first set velocity is based on at least one of the corresponding velocities of the first set and the second set velocity is based on at least one of the corresponding velocities of the second set. In some of those implementations, the yaw parameter of the additional vehicle includes a yaw rate of the additional vehicle. In some versions of those implementations, determining the yaw parameter of the additional vehicle based on comparison of the first set velocity to the second set velocity further includes: determining a distance based on the spatial offset between the first set and the second set; and determining the yaw rate as a function of the first set velocity, the second set velocity, and the distance. In some of those versions, determining the yaw rate as a function of the first set velocity, the second set velocity, and the distance includes: determining a velocity differential between the first set velocity and the second set velocity; and converting the velocity differential to the yaw rate based on the distance.

In some implementations, the yaw parameter includes a yaw rate, and determining the yaw parameter based on multiple of the corresponding velocities indicated by the phase coherent LIDAR monopulse data includes: identifying a stored model for the additional vehicle; and determining the yaw rate based on the multiple of the corresponding velocities and based on the stored model for the additional vehicle. In some of those implementations, determining the yaw rate based on the multiple of the corresponding velocities and based on the stored model for the additional vehicle includes: determining a velocity differential based on the multiple of the corresponding velocities; and converting the velocity differential to the yaw rate based on the stored model for the additional vehicle.

In some implementations, the yaw parameter includes a yaw rate, and determining the yaw parameter of the additional vehicle based on the phase coherent LIDAR monopulse data includes: processing at least part of the phase coherent LIDAR monopulse data using a trained machine learning model; generating, based on processing of the at least part of the phase coherent LIDAR monopulse data using the trained machine learning model, an output that indicates that the yaw rate; and determining the yaw rate based on the output.

In some implementations, the phase coherent LIDAR component is an FMCW LIDAR component.

In some implementations, a method is provided that includes receiving, from a phase coherent LIDAR component of a vehicle, phase coherent LIDAR data capturing an environment of the vehicle. The phase coherent LIDAR data indicates, for each of a plurality of points in the environment of the vehicle, at least one corresponding range and at least one corresponding velocity based on a corresponding sensing event of the phase coherent LIDAR component. The method further includes determining that a subgroup of the phase coherent LIDAR data corresponds to an additional vehicle that is in the environment and that is in addition to the vehicle. The method further includes determining, based on multiple corresponding velocities indicated by the phase coherent LIDAR data of the subgroup, a yaw parameter of the additional vehicle. The method further includes providing the determined yaw parameter to at least one subsystem of the vehicle, such as a planning subsystem and/or a control subsystem of the vehicle.

In some implementations, a method is provided that includes receiving, from a phase coherent component of a vehicle, phase coherent LIDAR data that captures an environment of the vehicle, and that indicates, for each of a plurality of points in the environment of the vehicle, at least one corresponding range and at least one corresponding velocity based on a corresponding sensing event of the phase coherent LIDAR component. The method further includes determining, based on multiple of the corresponding velocities indicated by the phase coherent LIDAR data, a yaw parameter of an additional vehicle that is in the environment of the vehicle. The method further includes providing the determined yaw parameter to at least one subsystem of the vehicle, such as a planning subsystem and/or a control subsystem of the vehicle.

The preceding two implementations, and other implementations of the technology disclosed herein, can include one or more of the following features.

In some implementations, the yaw parameter includes a yaw rate, and determining the yaw parameter of the additional vehicle based on the phase coherent LIDAR data includes processing at least part of the phase coherent LIDAR data using a trained machine learning model; generating, based on processing of the at least part of the phase coherent LIDAR data using the trained machine learning model, an output that indicates that the yaw rate; and determining the yaw rate based on the output.

In some implementations, the phase coherent LIDAR component is a phase coherent monopulse component, and the phase coherent LIDAR data is phase coherent LIDAR monopulse data. In some additional or alternative implementations, the phase coherent LIDAR component is an FMCW LIDAR component.

In some implementations, a method of training a machine learning model is provided. The machine learning model is to be used in autonomous control of at least one autonomous vehicle, and the method includes generating a plurality of training instances. Generating each of the training instances includes: generating training instance input of the training instance based on a corresponding instance of vision data from a vision component of a corresponding autonomous vehicle; and generating a supervised training instance output of the training instance based on a corresponding instance of additional vehicle data that is based on one or more sensors of a corresponding additional vehicle that is captured by the corresponding instance of vision data. The corresponding instance of additional vehicle data indicates a corresponding current state of at least one dynamic property of the corresponding additional vehicle. The corresponding instance of additional vehicle data is used in generating the supervised training instance output based on determining that the corresponding instance of additional vehicle data temporally corresponds to the corresponding instance of vision data. The method further includes training the machine learning model based on the plurality of training instances, and providing the trained machine learning model for use in control of the at least one autonomous vehicle.

These and other implementations of the technology disclosed herein can optionally include one or more of the following features.

In some implementations, the corresponding instance of vision data is light Detection and Ranging (LIDAR) data and the vision component is a LIDAR component. In some of those implementations, the LIDAR component is a phase coherent LIDAR component and the LIDAR data includes a group of LIDAR data points of a sensing cycle of the phase coherent LIDAR component. Each of the LIDAR data points of the group indicates a corresponding range and a corresponding velocity for a corresponding point in the environment, and each is generated based on a corresponding sensing event of the sensing cycle.

In some implementations, the supervised training instance output of the training instance further includes an indication of a bounding area that bounds a portion of the vision data that captures the corresponding additional vehicle.

In some implementations, training the machine learning model includes: processing, using the machine learning model, the training instance inputs of the training instances to generate predicted outputs; generating losses based on the predicted outputs and the supervised training instance outputs of the training instances; and updating the machine learning model based on the generated losses.

In some implementations, the instance of additional vehicle data includes one or more yaw parameters and the one or more sensors of the corresponding additional vehicle include at least a yaw rate sensor. In some of those implementations, the additional vehicle data is determined based on monitoring of a controller area network of the corresponding additional vehicle.

In some implementations, the instance of additional vehicle data includes one or both of velocity and acceleration of the corresponding additional vehicle.

In some implementations, the instance of additional vehicle data includes yaw parameters and one or both of velocity and acceleration.

In some implementations, the method further includes: processing, by at least one processor of a given autonomous vehicle of the at least one autonomous vehicle, given vision data (captured by a given vision component of the given autonomous vehicle) using the trained machine learning model; generating, based on the processing, a predicted state of a given additional vehicle captured by the given vision data; and controlling the given autonomous vehicle based on the predicted state. In some of those implementations, the given vision data is a subgroup of vision data captured during a sensing cycle of the vision component, and the method further includes generating the subgroup of vision data based on determining the subgroup corresponds to the given additional vehicle. In some version of those implementations, determining the subgroup corresponds to the given additional vehicle includes: processing the vision data using an additional object detection and classification model; and determining the subgroup corresponds to the given additional vehicle based on output generated based on processing the vision data using the additional object detection and classification model.

In some implementations, a method of controlling an autonomous vehicle using a trained machine learning model is provided. The method is implemented by one or more processors of the autonomous vehicle, and the method includes processing given vision data using the trained machine learning model, where the given vision data is captured by a vision component of the autonomous vehicle. The method further includes generating, based on the processing, a predicted state of at least one dynamic property given additional vehicle captured by the given vision data. The method further includes controlling the autonomous vehicle based on the predicted state. The trained machine learning model is trained based on a plurality of training instances that each includes: training instance input that is based on a corresponding instance of vision data from a vision component of a corresponding autonomous vehicle; and supervised training instance output that is based on a corresponding instance of additional vehicle data that is based on one or more sensors of a corresponding additional vehicle that is captured by the corresponding instance of vision data.

These and other implementations of the technology disclosed herein can include one or more of the following features.

In some implementations, the given vision data is a subgroup of vision data captured during a sensing cycle of the vision component, and the method further includes generating the subgroup of vision data based on determining the subgroup corresponds to the given additional vehicle. In some of those implementations, determining the subgroup corresponds to the given additional vehicle includes: processing the vision data using an additional object detection and classification model; and determining the subgroup corresponds to the given additional vehicle based on output generated based on processing the vision data using the additional object detection and classification model.

In some implementations, controlling the autonomous vehicle includes controlling speed and/or direction of the autonomous vehicle.

In some implementations, the at least one property includes a yaw rate and/or a yaw direction of the additional vehicle.

In some implementations, the at least one property includes velocity and/or acceleration of the additional vehicle.

In some implementations, the at least one property includes a yaw parameter, velocity, and/or acceleration of the additional vehicle.

In addition, some implementations include an autonomous vehicle with one or more processors that are operable to execute instructions stored in associated memory, and where the instructions are configured to cause performance of any of the methods described herein. Some implementations additionally or alternatively include one or more non-transitory computer readable storage media storing computer instructions executable by one or more processors to perform any of the methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
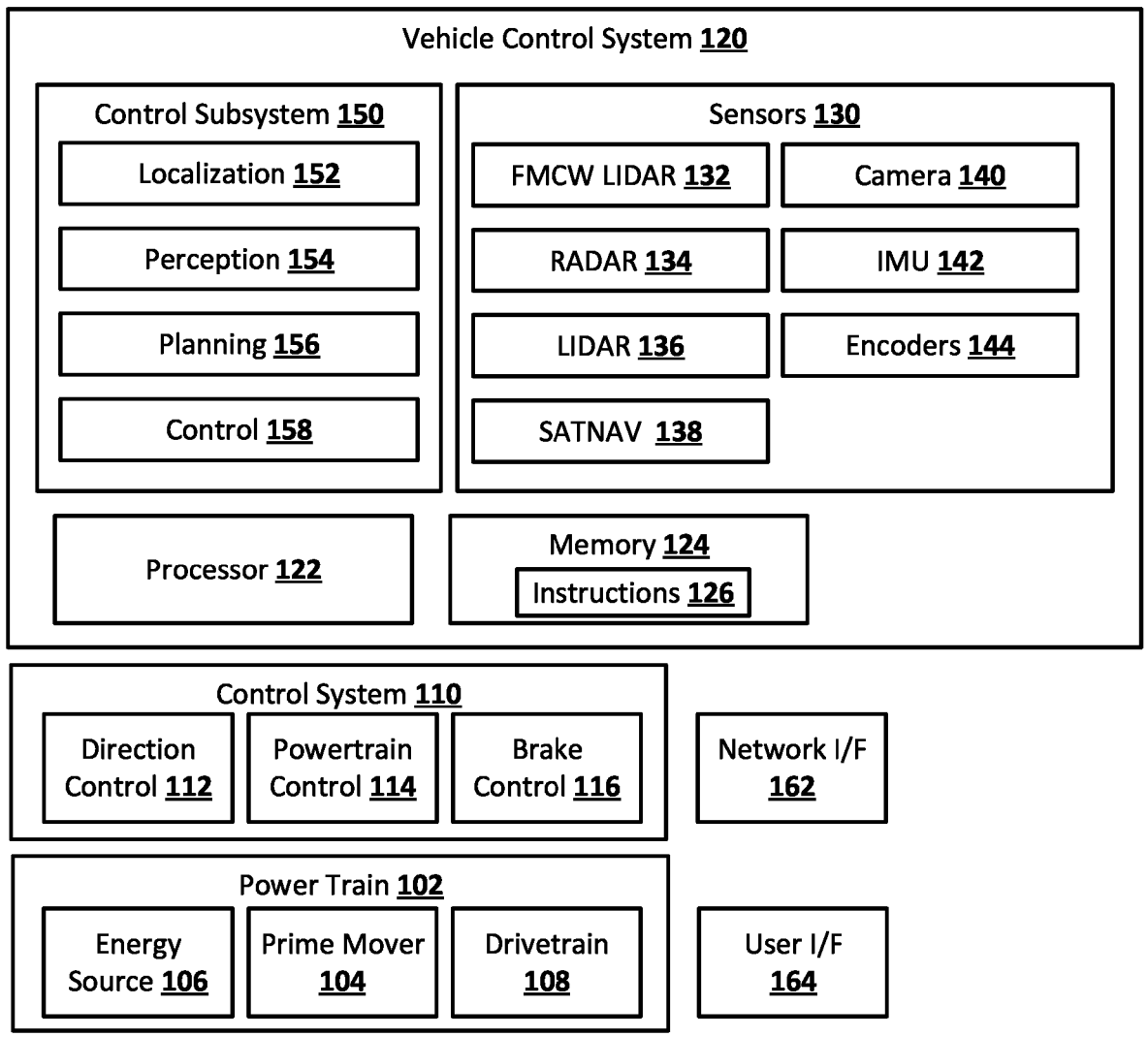
FIG. 1 illustrates an example environment in which implementations disclosed herein can be implemented.
Figure 1:
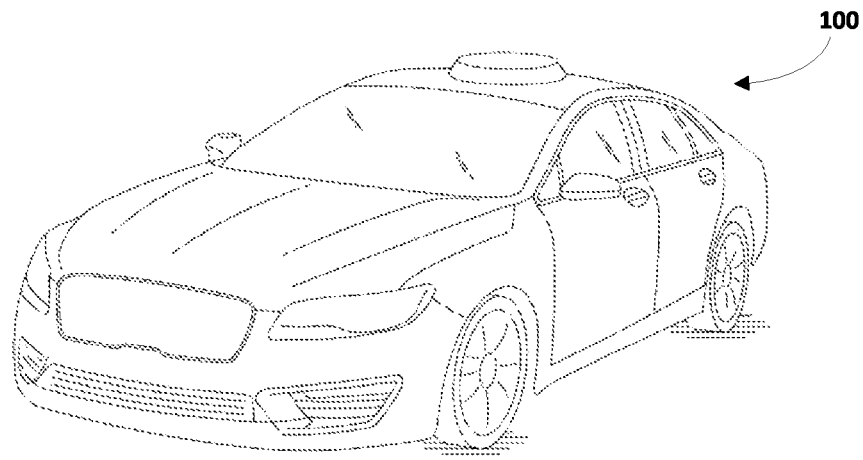

In various levels of autonomous control of a vehicle (e.g., any of SAE Levels 1-5 described above), it is necessary to determine various parameters of the so-called ego vehicle (i.e., the vehicle being autonomously controlled)—and to adapt autonomous control of the ego vehicle based on the various determined parameters of the ego vehicle itself. One such parameter is yaw rate of the ego vehicle. Yaw rate of a vehicle is the angular velocity of its rotation about its yaw axis, and is often measured in radians per second or degrees per second. Yaw rate of an ego vehicle can be determined, for example, based on output from a yaw rate sensor of the ego vehicle, such as a piezoelectric or micromechanical sensor(s) that measure Coriolis force of the ego vehicle. Yaw rate of an ego vehicle has been utilized in various vehicle control techniques such as electronic stability control (ESC) of the ego vehicle. In ESC, output from the yaw rate sensor and other sensor(s) can be utilized to adapt control of, for example, an anti-lock braking system (ABS), to thereby mitigate loss of traction/skidding of the ego vehicle.

In various levels of autonomous control of an ego vehicle (hereinafter also referred to as the "vehicle" for brevity), it is also desirable and/or necessary to determine various parameters of additional vehicle(s) that are in the environment of the ego vehicle and that are in addition to the ego vehicle. For example, it can be necessary to determine the pose (position and optionally orientation) of an additional vehicle relative to the vehicle, and to determine how the additional vehicle is moving relative to the vehicle. For instance, autonomous evasive braking and/or autonomous evasive steering of a vehicle can be required when it is determined that the pose and the movement of an additional vehicle may cause the additional vehicle to be too proximal to the vehicle if the vehicle continues on its currently intended trajectory.

Implementations disclosed herein are generally directed to determining yaw parameter(s) of an additional vehicle, and adapting autonomous control of a vehicle based on the determined yaw parameter(s) of the additional vehicle. For example, autonomous steering, acceleration, and/or deceleration of the vehicle can be adapted based on the determined yaw parameter(s) of the additional vehicle. The yaw parameter(s) of the additional vehicle can include, for example, at least one yaw rate of the additional vehicle. The yaw rate can indicate an angular rate of the additional vehicle's rotation about its yaw axis, and optionally a direction of that rotation. The yaw parameter(s) of the additional vehicle can additionally or alternatively include at least one velocity differential that indicates a magnitude of difference in velocity between two portions of the additional vehicle, optionally along with an indication of a direction of rotation of the additional vehicle about its yaw axis. The yaw parameter(s) can additionally or alternatively include an indication of whether the additional vehicle is experiencing yaw movement (e.g., whether the additional vehicle is experiencing at least a threshold degree of movement around its yaw axis).

In many implementations disclosed herein, the yaw parameter(s) of the additional vehicle are determined based on data from a phase coherent Light Detection and Ranging (LIDAR) component of the vehicle. Data from a phase coherent LIDAR component of a vehicle is referred to herein as "phase coherent LIDAR data". As described herein, phase coherent LIDAR data can indicate, for each of a plurality of points in an environment, at least a range for the point and a velocity for the point. The range for a point indicates distance to the point from receiver(s) of the phase coherent LIDAR component. The velocity for the point indicates a magnitude (and optionally a direction) of the velocity for the point. The indicated range and velocity for a point is based on a corresponding sensing event of the phase coherent LIDAR component. Accordingly, through sensing events of a sensing cycle, phase coherent LIDAR data indicating instantaneous ranges and instantaneous velocities for a large quantity of points in the environment can be determined. Implementations disclosed herein can determine, based on the instantaneous ranges and instantaneous velocities indicated by at least some of the FMCW LIDAR data, instantaneous yaw parameter(s) of an additional vehicle. Accordingly, yaw parameter(s) determined based on phase coherent LIDAR data of a sensing cycle provide yaw information for the additional vehicle based on its yaw movement during the sensing cycle, without requiring reference to phase coherent LIDAR data from future sensing cycle(s). This enables quick resolution of current yaw parameter(s) of the additional vehicle, and resultantly enables quick determination of whether adaptation of control of the vehicle is needed in view of the current yaw parameter(s) (and quick adaptation when it is determined adaptation is needed).

Generally, LIDAR is a technique that uses reflections of electromagnetic waves in the optical spectra to determine ranges of points in an environment. For example, some LIDAR implementations determine the ranges of the points based on measuring the round-trip delay of light pulses to the points. A LIDAR component can include a light source (e.g., a laser) for generating light pulses in the optical spectra, optics (e.g., mirrors) for directing the light source (e.g., to scan the azimuth and elevation), a sensor for measuring reflected pulses, and local processor(s) and/or other electronic components for processing the reflected pulses. The reflected pulses can be processed to determine ranges to points of target(s) in the environment based on time delay between transmitted and reflected pulses (and using the speed of light). In some implementations, LIDAR components generate output, based on the processing, that is a three-dimensional (3D) point cloud possibly with intensity values (based on the intensity of the reflected pulses).

Generally, phase coherent LIDAR is a technique that uses reflections of electromagnetic waves in the optical spectra to determine data that indicates ranges and radial velocities of points in an environment. A phase coherent LIDAR component includes at least one tunable laser (or other light source) that generates a waveform, and includes at least one receiver, such as a coherent optical receiver. The phase coherent LIDAR component can also include one or more components for directing the tunable laser, such as optics that can be utilized to direct (in azimuth and/or elevation) the waveform from the tunable laser to a plurality of points in an environment. Further, the phase coherent LIDAR component can include local processor(s) and/or other electronic components for processing reflections of the waveform. The tunable laser of a phase coherent LIDAR component is tunable in that it can be controlled so that the waveform it generates is encoded by modifying one or more properties of the waveform across the waveform. The tunable laser can be controlled to generate one or more of various types of encoded waveforms such as chirped, stepped, and/or pulsed waveforms.

A frequency-modulated continuous wave (FMCW) LIDAR component is one particular type of phase coherent LIDAR component. An FMCW LIDAR component at least selectively (e.g., always when in use) controls its tunable laser so that it generates a waveform that is both: encoded through frequency modulation, and continuous. For example, the waveform can be a continuous stepped waveform that is encoded through frequency modulation. For instance, the tunable laser can be controlled to generate a stepped waveform that is encoded through modification of the frequency of the steps. Data from an FMCW LIDAR component of a vehicle is referred to herein as "FMCW LIDAR data". Accordingly, "phase coherent LIDAR data" can be "FMCW LIDAR data" when it is generated by an FMCW LIDAR component based on a waveform that is both encoded through frequency modulation and is continuous.

During a sensing cycle of a phase coherent LIDAR component, the transmitted encoded waveform is sequentially directed to, and sequentially reflects off of, each of a plurality of points in the environment. Reflected portions of the encoded waveform are each detected, in a corresponding sensing event of the sensing cycle, by the at least one receiver of the phase coherent LIDAR component. For example, the reflected portion of a sensing event can be detected by the at least one coherent optical receiver using a coherent-detection scheme in which the reflected portion is mixed with a local optical signal that corresponds to the transmitted encoded waveform. The coherent-detection scheme can be, for example, homodyne mixing, heterodyne mixing, self-heterodyne mixing, or other coherent-detection scheme. The resulting signal generated from mixing the reflected portion with the local optical signal indicates both: (1) range to the corresponding point, and (2) velocity of the corresponding point. For example, the resulting signal can be processed by applying a two-dimensional Fourier transform to the signal, to generate a 2D spectrum with a frequency coordinate in the direct dimension and a frequency coordinate in the indirect dimension. The frequency coordinate in the direct dimension can be utilized to determine the range and the frequency coordinate in the indirect dimension can be utilized to determine the velocity. As one particular example, a homodyne detection scheme can be used in which the local optical signal is a split portion of the transmitted encoded waveform and is used as an optical local oscillator signal for the optical receiver. Mixing the local oscillator with a time delayed reflected portion during the sensing event yields a time varying intermediate frequency (IF) waveform, which is directly related to the range of the corresponding point. Further, when the point is moving, a Doppler frequency shift will be superimposed to the IF waveform, which can be used to determine radial velocity of the point. Through detections at multiple sensing events of a sensing cycle, phase coherent LIDAR data is generated for each of a plurality of points in the environment of the vehicle—and indicates range, velocity, and optionally intensity, for each of the points in the environment for the sensing cycle.

As mentioned above, phase coherent LIDAR data generated by a phase coherent LIDAR component is utilized in determining yaw parameter(s) of an additional vehicle in various implementations disclosed herein. In those implementations, the phase coherent LIDAR data of a sensing cycle indicates, directly or indirectly, a corresponding range and corresponding velocity for each of a plurality of points in an environment of a vehicle to which the phase coherent LIDAR component is coupled. In some of those implementations, the phase coherent LIDAR data includes a three-dimensional (3D) point cloud, with each point in the 3D point cloud defining a corresponding range (via its 3D coordinate in the 3D point cloud), corresponding velocity, and optionally a corresponding intensity. In some other implementations, the phase coherent LIDAR data includes a range-Doppler image, such as a range-Doppler image where each pixel defines a corresponding velocity (and optionally intensity) for a corresponding range and cross-range. In other words, each pixel in the range-Doppler image corresponds to a corresponding range and cross-range (which corresponds to a point in the environment), and defines a velocity for that range and cross-range. In yet other implementations, the phase coherent LIDAR data includes a time varying intermediate frequency (IF) waveform generated by optical receiver(s) of the FMCW LIDAR component based on mixing the local oscillator with the time delayed reflection. The time varying IF waveform can be utilized directly to determine yaw parameter(s) and/or can be processed using a Fourier transform and/or other techniques, and the processed data utilized to determine the yaw parameter(s). For example, each slice of the time varying IF waveform can be processed to determine range and velocity for a corresponding point in the environment, and the ranges and velocities for multiple points utilized in determining a yaw parameter. Accordingly, one or more of the preceding and/or other types of phase coherent LIDAR data can be generated by the phase coherent LIDAR component and utilized in determining yaw parameter(s) of an additional vehicle according to implementations disclosed herein. The type(s) of phase coherent LIDAR data generated and utilized in determining yaw parameter(s) can be dependent on, for example, the particular phase coherent LIDAR component being utilized. Also, it is noted that in some implementations the velocities indicated in received phase coherent LIDAR data can have the ego vehicle's velocity subtracted out (e.g., based on a velocity of the ego vehicle determined based on sensor(s) of the ego vehicle, or based on inferring the velocity of the ego vehicle based on velocities of static objects in the phase coherent LIDAR data). In some other implementations, the ego vehicle's velocity may not be subtracted out of the received phase coherent LIDAR data. In those implementations, the received phase coherent LIDAR data may optionally be processed to subtract out the ego vehicle's velocity.

In some implementations, the phase coherent LIDAR data is from a phase coherent LIDAR monopulse component that includes at least a first and second receiver, such as a first and second coherent optical receiver. In those implementations, each sensing event includes a first receiver sensing event by the first receiver and a second receiver sensing event by the second receiver. For example, the first receiver sensing event can include coherent mixing of a local oscillator with a first detection of a reflected portion of the waveform and the second receiver sensing event can include coherent mixing of the local oscillator with a second detection of a reflected portion of the waveform. The first receiver sensing event and the second receiver sensing event are denoted herein as separate events as they are by separate receivers. However, it is noted that the sensing events can each be of the same reflection and can occur concurrently, or substantially concurrently (e.g., within one millisecond of one another, within one microsecond of one another, or within one nanosecond of one another).

The first and second receivers are positionally offset relative to one another, thereby causing the first and second detections to vary (e.g., temporally and/or characteristically (e.g., in phase)). This enables at least one extra channel of data to be determined for a sensing event based on comparison of the first receiver sensing event and the second receiver sensing event. The extra channel can be utilized to increase the angular accuracy for point(s) determined based on the sensing event. For example, the extra channel can be based on amplitude and/or phase differences between the first and second receiver sensing events (e.g., differences in the time varying IF waveform generated by each of the first and second receivers in mixing with the local oscillator signal). For instance, the amplitude and/or phase differences can be compared to determine an angle (a particular angle or range of angles), for each of one or more point(s) determined based on the sensing event, where each angle is resolved so that the point(s) are smaller than the beam width of the reflection that resulted in the sensing event. Accordingly, the angle (e.g., azimuth and elevation relative to the receiver(s)) for a corresponding range can be determined to a sub-beam width level, thereby providing greater accuracy of the determined angle. Moreover, the point can be localized to a sub-beam width level as the position of the point is defined by the angle and the range.

It is noted that, in some implementations, multiple range/velocity pairs can be determined based on a single sensing event (e.g., based on differences in range and/or velocity among the multiple range/velocity pairs indicated by a range-Doppler image and/or IF waveform). In those implementations, a corresponding angle can be determined for each of the multiple range/velocity pairs, and can each be resolved to a sub-beam width level. In other words, a single sensing event of a sensing cycle can be utilized to determine a corresponding range and corresponding velocity for each of two or more points. In some versions of those implementations, beam width(s) of the electromagnetic output that is output by the laser of a phase coherent LIDAR component can be purposefully fattened/widened to enable covering of more space by the beam width, as compared to non-fattened beam widths. For example, a beam width can be fixed so that, at a given distance from the phrase coherent LIDAR component (e.g., 10 meters, 15 meters, 20 meters, 50 meters, or other distance), there are no coverage gaps between the beams of a sensing cycle. Increased angular accuracy techniques described herein can be utilized to determine a corresponding range and corresponding velocity for each of two or more points that are within the fattened beam width of each beam of the sensing cycle. This enables determination of ranges and velocities with a degree of accuracy that, absent increased angular velocity techniques described herein, would otherwise require a greater quantity of beams and sensing events in a sensing cycle. Accordingly, increased angular velocity techniques described herein enable resolution of ranges and velocities with a given degree of accuracy in a sensing cycle, while reducing the quantity of sensing events in the sensing cycle needed to achieve the degree of accuracy. This can decrease the quantity of sensing events that occur in each sensing cycle, thereby conserving hardware resources (e.g., laser resources and/or power source resources). This can additionally or alternatively enable resolution of a given quantity of ranges and velocities for an area in a reduced amount of time, thereby providing excess time for resolving ranges and velocities for additional area(s) (e.g., enabling a larger total area to be covered in each sensing cycle without increasing the duration of the sensing cycle) and/or enabling quick re-resolving of updated ranges and velocities for the area (e.g., enabling sensing cycles to be shortened, without reduction of angular accuracy).

Accordingly, with a phase coherent LIDAR monopulse component, super pixel resolution can be achieved while reducing the signal-to-noise ratio (SNR) (i.e., increasing the noise) through splitting of the reflection across two receivers. This can be beneficial in determining ranges and velocities for point(s) of an additional vehicle that is far away (from the phase coherent LIDAR monopulse component) and/or small. For example, it can increase the angular accuracy (more accurate positioning, in an angular sense, for a given point) for which range and velocity can be determined for a given return/sensing event—thereby increasing the resolution and enabling determination (or at least more accurate determination) of yaw parameter(s) for an additional vehicle that is far away and/or small, whereas yaw parameter(s) would otherwise not be determinable (or would at least be less accurate) for the additional vehicle that is far away and/or small.

In various implementations, with a phase coherent LIDAR monopulse component, super-resolution can additionally and/or alternatively be achieved while reducing the signal-to-noise ratio (SNR) (i.e., increasing the noise) through splitting of the reflection across two or more receivers. The two or more receivers are positionally offset relative to one another, thereby causing respective detections of the receivers to vary (e.g., temporally and/or characteristically (e.g., in phase)). This enables non-redundant LIDAR data from the sensing event at each receiver to be combined to generate LIDAR data (e.g., a range-Doppler image and/or IF waveform) that is of higher resolution (e.g., higher resolution range and/or velocity) than the LIDAR data from any one of the sensing events at a respective receiver. In other words, each sensing event can include a receiver sensing event at each receiver (e.g., a first receiver sensing event at a first receiver, a second receiver sensing event at a second receiver, etc.) and produce respective LIDAR data for the respective receiver sensing event. The non-redundant LIDAR data for the receiver sensing events can be combined to construct super-resolution LIDAR data for the sensing event. The non-redundant LIDAR data can be based on, for example, amplitude and/or phase differences between the respective receiver sensing events (e.g., differences in the time varying IF waveform generated by each of the first and second receivers in mixing with the local oscillator signal). Various techniques can be utilized to generate super-resolution LIDAR data from multiple receiver sensing events, such as frequency domain techniques (e.g., based on shift and aliasing properties of the Continuous and Discrete Fourier Transforms) and/or spatial domain techniques (e.g., non-iterative and/or iterative techniques). Spatial domain techniques can be utilized to apply one or more flexible estimators in constructing super-resolution LIDAR data from lower resolution LIDAR data from receiver sensing events. Such flexible estimators include, for example, Maximum likelihood, Maximum a Posteriori, Projection Onto Convex Sets, Bayesian treatments, etc. Additional description of some phase coherent LIDAR techniques and some phase coherent LIDAR components are provided herein, including monopulse components and techniques.

As mentioned above, during a sensing cycle of a phase coherent LIDAR component, a transmitted encoded waveform is sequentially directed to, and sequentially reflects off of, each of a plurality of points in the environment—and reflected portions of the encoded waveform are each detected, in a corresponding sensing event of the sensing cycle, by the at least one receiver of the phase coherent LIDAR component. During a sensing cycle, the waveform is directed to a plurality of points in an area of an environment, and corresponding reflections detected, without the waveform being redirected to those points in the sensing cycle. Accordingly, the range and velocity for a point that is indicated by phase coherent LIDAR data of a sensing cycle can be instantaneous in that is based on single sensing event without reference to a prior or subsequent sensing event. In some implementations, each of multiple (e.g., all) sensing cycles can have the same duration, the same field-of-view, and/or the same pattern of waveform distribution (through directing of the waveform during the sensing cycle). For example, each of multiple sensing cycles that are each a sweep can have the same duration, the same field-of-view, and the same pattern of waveform distribution. However, in many other implementations the duration, field-of-view, and/or waveform distribution pattern can vary amongst one or more sensing cycles. For example, a first sensing cycle can be of a first duration, have a first field-of view, and a first waveform distribution pattern; and a second sensing cycle can be of a second duration that is shorter than the first, have a second field-of-view that is a subset of the first field-of-view, and have a second waveform distribution pattern that is denser than the first.

Turning now to the Figures, FIG. 1 illustrates an example autonomous vehicle 100 within which the various techniques disclosed herein may be implemented. Vehicle 100, for example, may include a powertrain 102 including a prime mover 104 powered by an energy source 106 and capable of providing power to a drivetrain 108, as well as a control system 110 including a direction control 112, a powertrain control 114, and brake control 116. Vehicle 100 may be implemented as any number of different types of vehicles, including vehicles capable of transporting people and/or cargo, and capable of traveling by land, by sea, by air, underground, undersea and/or in space, and it will be appreciated that the aforementioned components 102-116 can vary widely based upon the type of vehicle within which these components are utilized.

The implementations discussed hereinafter, for example, will focus on a wheeled land vehicle such as a car, van, truck, bus, etc. In such implementations, the prime mover 104 may include one or more electric motors and/or an internal combustion engine (among others). The energy source 106 may include, for example, a fuel system (e.g., providing gasoline, diesel, hydrogen, etc.), a battery system, solar panels or other renewable energy source, and/or a fuel cell system. Drivetrain 108 may include wheels and/or tires along with a transmission and/or any other mechanical drive components suitable for converting the output of prime mover 104 into vehicular motion, as well as one or more brakes configured to controllably stop or slow the vehicle 100 and direction or steering components suitable for controlling the trajectory of the vehicle 100 (e.g., a rack and pinion steering linkage enabling one or more wheels of vehicle 100 to pivot about a generally vertical axis to vary an angle of the rotational planes of the wheels relative to the longitudinal axis of the vehicle). In some implementations, combinations of powertrains and energy sources may be used (e.g., in the case of electric/gas hybrid vehicles), and in some instances multiple electric motors (e.g., dedicated to individual wheels or axles) may be used as a prime mover.

Direction control 112 may include one or more actuators and/or sensors for controlling and receiving feedback from the direction or steering components to enable the vehicle 100 to follow a desired trajectory. Powertrain control 114 may be configured to control the output of powertrain 102, e.g., to control the output power of prime mover 104, to control a gear of a transmission in drivetrain 108, etc., thereby controlling a speed and/or direction of the vehicle 100. Brake control 116 may be configured to control one or more brakes that slow or stop vehicle 100, e.g., disk or drum brakes coupled to the wheels of the vehicle.

Other vehicle types, including but not limited to airplanes, space vehicles, helicopters, drones, military vehicles, all-terrain or tracked vehicles, ships, submarines, construction equipment, etc., will necessarily utilize different powertrains, drivetrains, energy sources, direction controls, powertrain controls and brake controls, as will be appreciated by those of ordinary skill having the benefit of the instant disclosure. Moreover, in some implementations some of the components may be combined, e.g., where directional control of a vehicle is primarily handled by varying an output of one or more prime movers. Therefore, implementations disclosed herein not limited to the particular application of the herein-described techniques in an autonomous wheeled land vehicle.

In the illustrated implementation, full or semi-autonomous control over vehicle 100 is implemented in a vehicle control system 120, which may include one or more processors 122 and one or more memories 124, with each processor 122 configured to execute program code instructions 126 stored in a memory 124. The processor(s) 122 can include, for example, graphics processing unit(s) (GPU(s)) and/or central processing unit(s) (CPU(s)).

Sensors 130 may include various sensors suitable for collecting information from a vehicle's surrounding environment for use in controlling the operation of the vehicle. For example, sensors 130 can include a frequency-modulated continuous wave (FMCW) Light Detection and Ranging (LIDAR) component 132 of the vehicle (FMCW). As described herein, the FMCW LIDAR component 132 can generate FMCW LIDAR data that can be utilized in determining corresponding yaw parameter(s) for each of one or more additional vehicles in an environment of the vehicle 100. The FMCW LIDAR data generated by FMCW LIDAR component 132 indicates, for each of a plurality of points in the environment of the vehicle, a corresponding range and a corresponding velocity based on a corresponding sensing event of the FMCW LIDAR component. Although an FMCW LIDAR component is illustrated in FIG. 1 (and other Figures) and described herein in association with many figures, in many implementations a phase coherent LIDAR component that is not an FMCW LIDAR component can instead be utilized. Further, in those implementations phase coherent LIDAR data, that is not FMCW LIDAR data, can be utilized in lieu of FMCW LIDAR data.

Sensors 130 can also optionally include a Radio Detection and Ranging (RADAR) component 134 and/or a LIDAR component 136 (non-phase coherent, that generates data that can be utilized to determine ranges, but not velocities). Further, sensors can also optionally include a satellite navigation (SATNAV) component 138, e.g., compatible with any of various satellite navigation systems such as GPS, GLONASS, Galileo, Compass, etc. The SATNAV component 138 can be used to determine the location of the vehicle on the Earth using satellite signals. Sensors 130 can also optionally include a camera 140, an inertial measurement unit (IMU) 142 and/or one or more wheel encoders 144. The camera 140 can be a monographic or stereographic camera and can record still and/or video imagers. The IMU 142 can include multiple gyroscopes and accelerometers capable of detecting linear and rotational motion of the vehicle 100 in three directions. Wheel encoders 142 may be used to monitor the rotation of one or more wheels of vehicle 100.

The outputs of sensors 130 may be provided to a set of control subsystems 150, including, a localization subsystem 152, a planning subsystem 156, a perception subsystem 154, and a control subsystem 158. Localization subsystem 152 is principally responsible for precisely determining the location and orientation (also sometimes referred to as "pose") of vehicle 100 within its surrounding environment, and generally within some frame of reference. Perception subsystem 154 is principally responsible for detecting, tracking and/or identifying elements within the environment surrounding vehicle 100. For example, and as described herein, perception subsystem 154 can, among other things, determine a yaw rate for each of one or more additional vehicles in the environment surrounding vehicle 100. Planning subsystem 156 is principally responsible for planning a trajectory for vehicle 100 over some timeframe given a desired destination as well as the static and moving objects within the environment. For example, and as described herein, planning subsystem can plan a trajectory for vehicle 100 based at least in part on a determined yaw parameter (determined by perception subsystem 154) of an additional vehicle in the environment surrounding vehicle 100. Control subsystem 158 is principally responsible for generating suitable control signals for controlling the various controls in control system 110 in order to implement the planned trajectory of the vehicle 100.

It will be appreciated that the collection of components illustrated in FIG. 1 for vehicle control system 120 is merely exemplary in nature. Individual sensors may be omitted in some implementations. Additionally or alternatively, in some implementations multiple sensors of the types illustrated in FIG. 1 may be used for redundancy and/or to cover different regions around a vehicle, and other types of sensors may be used. Likewise, different types and/or combinations of control subsystems may be used in other implementations. Further, while subsystems 152-160 are illustrated as being separate from processors 122 and memory 124, it will be appreciated that in some implementations, some or all of the functionality of a subsystem 152-160 may be implemented with program code instructions 126 resident in one or more memories 124 and executed by one or more processors 122, and that these subsystems 152-160 may in some instances be implemented using the same processors and/or memory. Subsystems in some implementations may be implemented at least in part using various dedicated circuit logic, various processors, various field-programmable gate arrays ("FPGA"), various application-specific integrated circuits ("ASIC"), various real time controllers, and the like, and as noted above, multiple subsystems may utilize circuitry, processors, sensors and/or other components. Further, the various components in vehicle control system 120 may be networked in various manners.

In some implementations, vehicle 100 may also include a secondary vehicle control system (not illustrated), which may be used as a redundant or backup control system for vehicle 100. In some implementations, the secondary vehicle control system may be capable of fully operating autonomous vehicle 100 in the event of an adverse event in vehicle control system 120, while in other implementations, the secondary vehicle control system may only have limited functionality, e.g., to perform a controlled stop of vehicle 100 in response to an adverse event detected in primary vehicle control system 120. In still other implementations, the secondary vehicle control system may be omitted.

In general, an innumerable number of different architectures, including various combinations of software, hardware, circuit logic, sensors, networks, etc. may be used to implement the various components illustrated in FIG. 1. Each processor may be implemented, for example, as a microprocessor and each memory may represent the random access memory (RAM) devices comprising a main storage, as well as any supplemental levels of memory, e.g., cache memories, non-volatile or backup memories (e.g., programmable or flash memories), read-only memories, etc. In addition, each memory may be considered to include memory storage physically located elsewhere in vehicle 100, e.g., any cache memory in a processor, as well as any storage capacity used as a virtual memory, e.g., as stored on a mass storage device or on another computer or controller. One or more processors illustrated in FIG. 1, or entirely separate processors, may be used to implement additional functionality in vehicle 100 outside of the purposes of autonomous control, e.g., to control entertainment systems, to operate doors, lights, convenience features, etc.

In addition, for additional storage, vehicle 100 may also include one or more mass storage devices, e.g., a removable disk drive, a hard disk drive, a direct access storage device (DASD), an optical drive (e.g., a CD drive, a DVD drive, etc.), a solid state storage drive (SSD), network attached storage, a storage area network, and/or a tape drive, among others. Furthermore, vehicle 100 may include a user interface 164 to enable vehicle 100 to receive a number of inputs from and generate outputs for a user or operator, e.g., one or more displays, touchscreens, voice and/or gesture interfaces, buttons and other tactile controls, etc. Otherwise, user input may be received via another computer or electronic device, e.g., via an app on a mobile device or via a web interface.

Moreover, vehicle 100 may include one or more network interfaces, e.g., network interface 162, suitable for communicating with one or more networks (e.g., a LAN, a WAN, a wireless network, and/or the Internet, among others) to permit the communication of information with other computers and electronic devices, including, for example, a central service, such as a cloud service, from which vehicle 100 receives environmental and other data for use in autonomous control thereof.

Each processor illustrated in FIG. 1, as well as various additional controllers and subsystems disclosed herein, generally operates under the control of an operating system and executes or otherwise relies upon various computer software applications, components, programs, objects, modules, data structures, etc., as will be described in greater detail below. Moreover, various applications, components, programs, objects, modules, etc. may also execute on one or more processors in another computer coupled to vehicle 100 via network, e.g., in a distributed, cloud-based, or client-server computing environment, whereby the processing required to implement the functions of a computer program may be allocated to multiple computers and/or services over a network.

In general, the routines executed to implement the various implementations described herein, whether implemented as part of an operating system or a specific application, component, program, object, module or sequence of instructions, or even a subset thereof, will be referred to herein as "program code." Program code typically comprises one or more instructions that are resident at various times in various memory and storage devices, and that, when read and executed by one or more processors, perform the steps necessary to execute steps or elements embodying the various aspects of the invention. Moreover, while implementations have and hereinafter will be described in the context of fully functioning computers and systems, it will be appreciated that the various implementations described herein are capable of being distributed as a program product in a variety of forms, and that implementations can be implemented regardless of the particular type of computer readable media used to actually carry out the distribution. Examples of computer readable media include tangible, non-transitory media such as volatile and non-volatile memory devices, floppy and other removable disks, solid state drives, hard disk drives, magnetic tape, and optical disks (e.g., CD-ROMs, DVDs, etc.), among others.

In addition, various program code described hereinafter may be identified based upon the application within which it is implemented in a specific implementation. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art, having the benefit of the present disclosure, will recognize that the exemplary environment illustrated in FIG. 1 is not intended to limit implementations disclosed herein. Indeed, those skilled in the art will recognize that other alternative hardware and/or software environments may be used without departing from the scope of implementations disclosed herein.

Figure 2A:
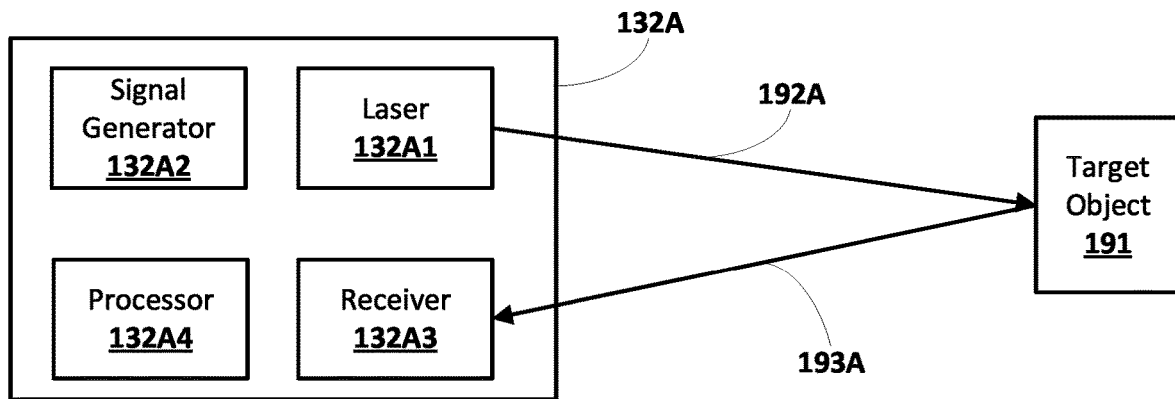
FIG. 2A schematically illustrates an implementation of an FMCW LIDAR component of FIG. 1.
Figure 2B:
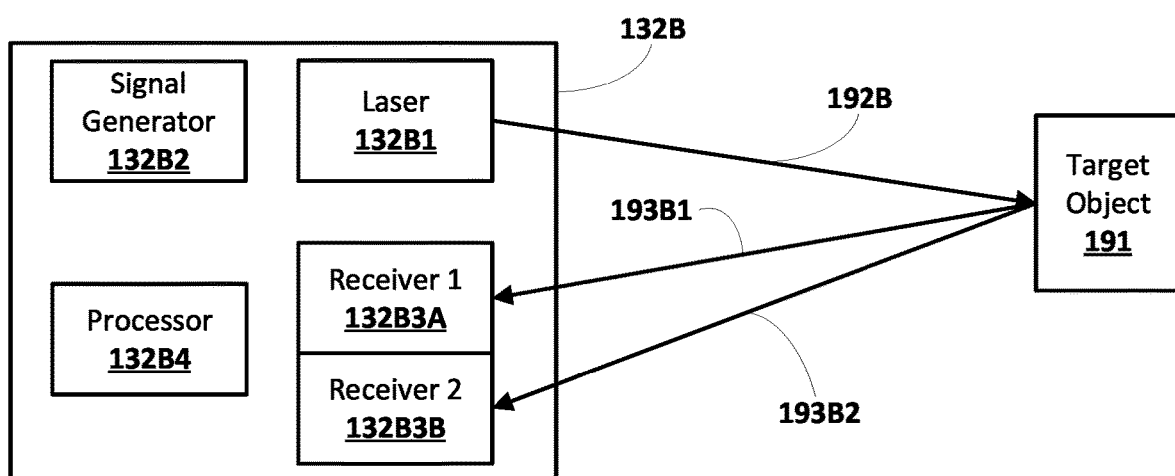
FIG. 2B schematically illustrates another implementation of an FMCW LIDAR component of FIG. 1.

Turning now to FIGS. 2A and 2B, two implementations of FMCW LIDAR component 132 of FIG. 1 are schematically illustrated. FIG. 2A illustrates an FMCW LIDAR component 132A that includes a single receiver 132A3, whereas FIG. 2B illustrates an FMCW LIDAR monopulse component 132B that includes two receivers 132B3A and 132B3B.

In FIG. 2A, FMCW LIDAR component 132A includes a tunable laser 132A1 whose optical output is controlled by signal generator 132A2. Signal generator 132A2 drives the laser 132A1 such that the laser 132A1 generates electromagnetic output that is in the optical spectra, and that is encoded through modification of the frequency of the electromagnetic output. The signal generator 132A2 generates a signal to cause the waveform to be encoded. Various types of frequency encoded waveforms can be generated via the signal generator 132A2 and the laser 132A1.

FIG. 2A illustrates a transmitted beam 192A from the laser 132A1 that is encoded as described in the preceding paragraph, and that is directed toward a point on a target object 191. The transmitted beam 192A is reflected off the point on the target object 191 and the reflection 193A is received at the receiver 132A3 during a sensing event. The transmitted beam 192A includes a slice of the encoded waveform and the reflection 193A also includes the slice of the encoded waveform. The slice of the encoded waveform is detected by the receiver 132A3 during the sensing event.

The receiver 132A3 can be a coherent receiver and the reflection 193A can be detected by the receiver 132A3 using a coherent-detection scheme in which the reflection 193A is mixed with a local optical signal, such as a local optical signal that is a split portion of the transmitted beam 192A. It is noted that the detection of the reflection 193A by the receiver 132A3 will be time delayed with respect to detection of the local optical signal (e.g., the split portion of the transmitted beam 192A). The coherent-detection scheme can be implemented by the processor 132A4 and can be, for example, homodyne mixing, heterodyne mixing, self-heterodyne mixing, or other coherent-detection scheme. The resulting signal generated from mixing the reflected portion with the local optical signal indicates both: (1) range to the point of the target object 191, and (2) velocity of the point of the target object 191. In some implementations, the processor 132A4 provides the resulting signal as FMCW LIDAR data for the point from the FMCW LIDAR component 132A. In some other implementations, the processor 132A4 performs further processing to generate FMCW LIDAR data for the point that directly indicates the range and the velocity of the point. For example, the range and the velocity of the point can be directly indicated in FMCW LIDAR data that is a 3D point cloud that indicates range and velocity values, or a range-Doppler image. Through detections over multiple sensing events, where a direction of the optical output from the laser 132A1 is varied (e.g., in Azimuth and/or Elevation), FMCW LIDAR data is generated by the FMCW LIDAR component for each of a plurality of points in the environment—and indicates range, velocity, and optionally intensity, for each of the points in the environment.

Although the description of FIG. 2A above describes an FMCW LIDAR component, it is noted that a phase coherent LIDAR component that is not FMCW can have the same and/or similar components. However, with the non-FMCW LIDAR component, the signal generator 132A2 can drive the laser 132A1 to generate a waveform that is non-continuous and/or that is encoded using a technique other than frequency modulation.

In FIG. 2B, FMCW LIDAR monopulse component 132B includes a tunable laser 132B1 whose optical output is controlled by signal generator 132B2. Signal generator 132B2 drives the laser 132B1 such that the laser 132B1 generates electromagnetic output that is in the optical spectra, and that is encoded through modification of the frequency of the electromagnetic output. The signal generator 132B2 generates a signal to cause the waveform to be encoded. Various types of encoded waveforms can be generated via the signal generator 132B2 and the laser 132B1.

FIG. 2B illustrates a transmitted beam 192B from the laser 132B1 that is encoded as described in the preceding paragraph, and that is directed toward a point on a target object 191. The transmitted beam 192B is reflected off the point on the target object 191 and, during a sensing event, a first reflection 193B1 is received at the first receiver 132B3A and a second reflection 193B2 is received at the second receiver 132B3B. The transmitted beam 192B includes a slice of the encoded waveform and the reflections 193B1 and 193B2 also includes the slice of the encoded waveform. The first and second receivers 132B3A and 132B3B can be coherent receivers and the sensing event can include a first receiver sensing event and a second receiver sensing event. The first receiver sensing event can include coherent mixing of a local oscillator (e.g., a split portion of the transmitted beam 192B) with a first detection of the first reflection 193B1 and the second receiver sensing event can include coherent mixing of the local oscillator with a second detection of the second reflection 193B2. The first and second receiver 132B3A and 132B3B are positionally offset relative to one another, thereby causing the first and second detections to vary. This enables the processor 132B4 to determine at least one extra channel of data for the sensing event based on comparison of the first receiver sensing event and the second receiver sensing event. For example, the processor 132B4 can determine the extra channel based on amplitude and/or phase differences between the first and second receiver sensing events (e.g., differences in the time varying IF generated by each of the first and second receivers in mixing with the local oscillator signal). For instance, the amplitude and/or phase differences can be compared to determine an angle (a particular angle or range of angles), for each of one or more point(s) determined based on the sensing event, where each angle is resolved so that the point(s) are smaller than the beam width of the reflection that resulted in the sensing event. Accordingly, the angle (e.g., azimuth and elevation relative to the receiver(s)) for a corresponding range can be determined to a sub-beam width level. Moreover, the point can be localized to a sub-beam width level as the position of the point is defined by the angle and the range. Accordingly, increased angular accuracy can be achieved while reducing the signal-to-noise ratio (SNR) (i.e., increasing the noise) through splitting of the reflection across two receivers. This can be beneficial in determining ranges and velocities for multiple points of an additional vehicle that is far away (from the FMCW LIDAR monopulse component) and/or small. Additionally or alternatively, and as described herein, the processor 132B4 can determine LIDAR data with super-resolution using non-redundant data from the first and second detections. For example, the processors 132B4 can construct super-resolution LIDAR data from lower-resolution LIDAR data from the first and second detections. Accordingly, super-resolution range and velocity can be determined, while reducing the SNR through the splitting of the reflection across two receivers.

In some implementations, the processor 132B4 provides the signal, generated from the first and second receiver sensing events, as FMCW LIDAR monopulse data for the points from the FMCW LIDAR monopulse component 132B. In some other implementations, the processor 132B4 performs further processing to generate FMCW LIDAR monopulse data for the points that directly indicates the range and the velocity of the points. For example, the range and the velocity of the points can be directly indicated in FMCW LIDAR monopulse data that is a 3D point cloud or a range-Doppler image. Through detections over multiple sensing events where a direction of the optical output from the laser 132B1 is varied (e.g., in Azimuth and/or Elevation), FMCW LIDAR monopulse data is generated by the FMCW LIDAR monopulse component 132B for each of a plurality of points in the environment—and indicates range, velocity, and optionally intensity, for each of the points in the environment.

Although the description of FIG. 2B above describes an FMCW LIDAR monopulse component, it is noted that a phase coherent LIDAR monopulse component that is not FMCW can have the same and/or similar components. However, with the non-FMCW LIDAR component, the signal generator 132B2 can drive the laser 132B1 to generate a waveform that is non-continuous and/or that is encoded using a technique other than frequency modulation.

Figure 3:
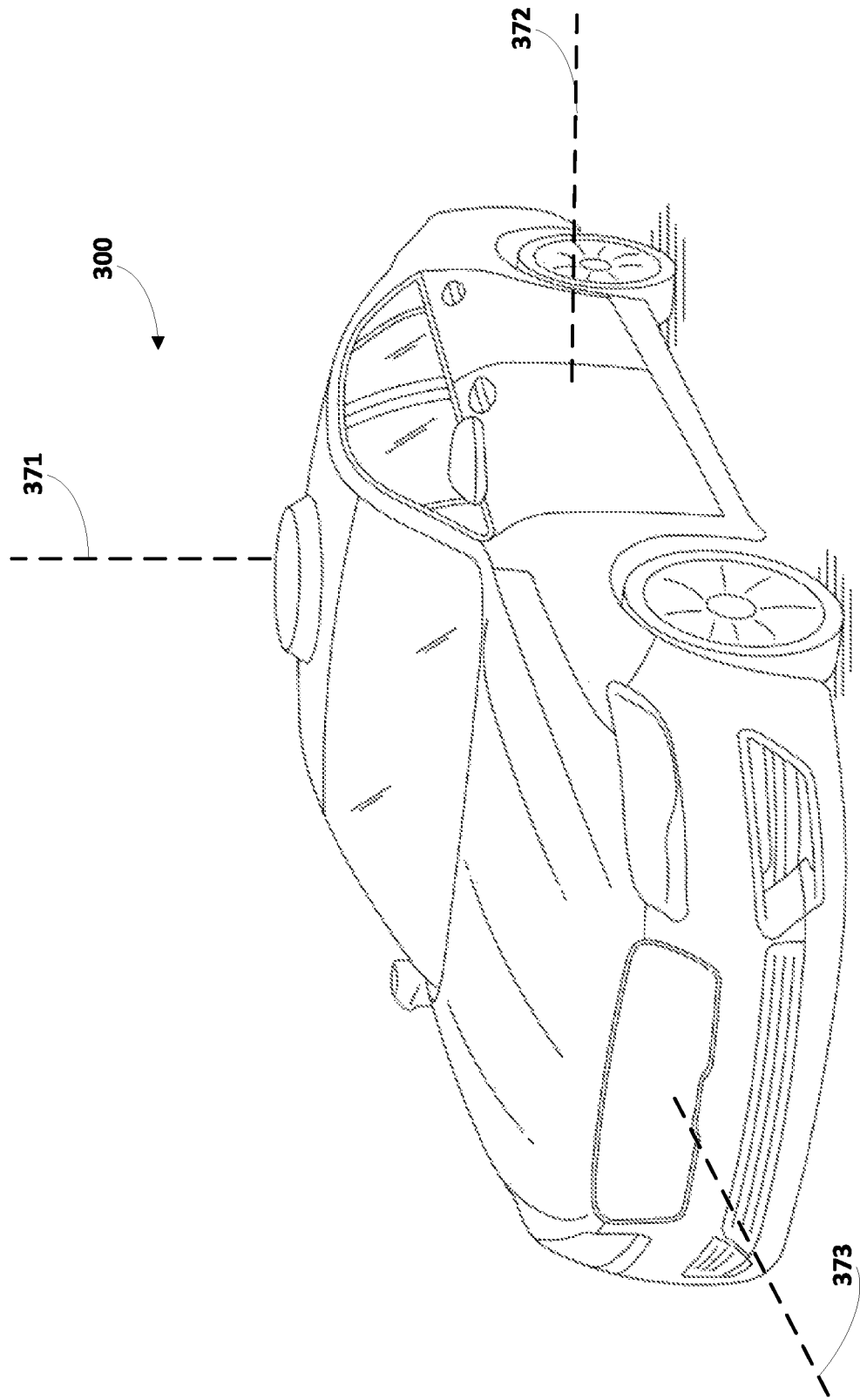
FIG. 3 illustrates an example additional vehicle, along with a yaw axis, a pitch axis, and a roll axis of the additional vehicle.

Turning now to FIG. 3, an example additional vehicle 300 is illustrated, along with a yaw axis 371, a pitch axis 372, and a roll axis 373 of the additional vehicle 300. The yaw axis 371 of the additional vehicle 300 is perpendicular to the axles of the additional vehicle 300. In some situations, the yaw axis 371 can intersect the rear axle of the additional vehicle 300, though this is not required—and the yaw axis 371 can even shift in certain situations, dependent on the cause and/or extent of the yaw movement of the additional vehicle 300. Rotation of the additional vehicle 300 about the yaw axis 371 can be caused by various factors, such as turning of the additional vehicle 300, loss of traction by the additional vehicle 300 (e.g., hydroplaning), the additional vehicle 300 impacting another object, etc. Yaw movement of the additional vehicle 300 is rotation of the additional vehicle 300 about the yaw axis 371, and yaw rate of the additional vehicle 300 is the angular velocity of its rotation about the yaw axis 371. Yaw rate is often measured in radians per second or degrees per second.

The roll axis 373 of the additional vehicle 300 is perpendicular to the yaw axis 371 and extends in a front-to-back manner along the additional vehicle 300. When the additional vehicle 300 is in motion, it will have an absolute object velocity along the roll axis 373. Such absolute object velocity can also be considered in adapting control of an autonomous vehicle in implementations described herein. However, it is noted that the absolute object velocity is separate from the yaw rate of the additional vehicle 300. For example, the additional vehicle 300 can have a relatively high absolute object velocity during movement, while having a zero or minimal yaw rate (e.g., if it's moving in a relatively straight path and without any loss of traction). The pitch axis of the additional vehicle 300 is perpendicular to the yaw axis 371 and the roll axis 373, and extends in a side-to-side manner along the additional vehicle 300.

Figure 4:
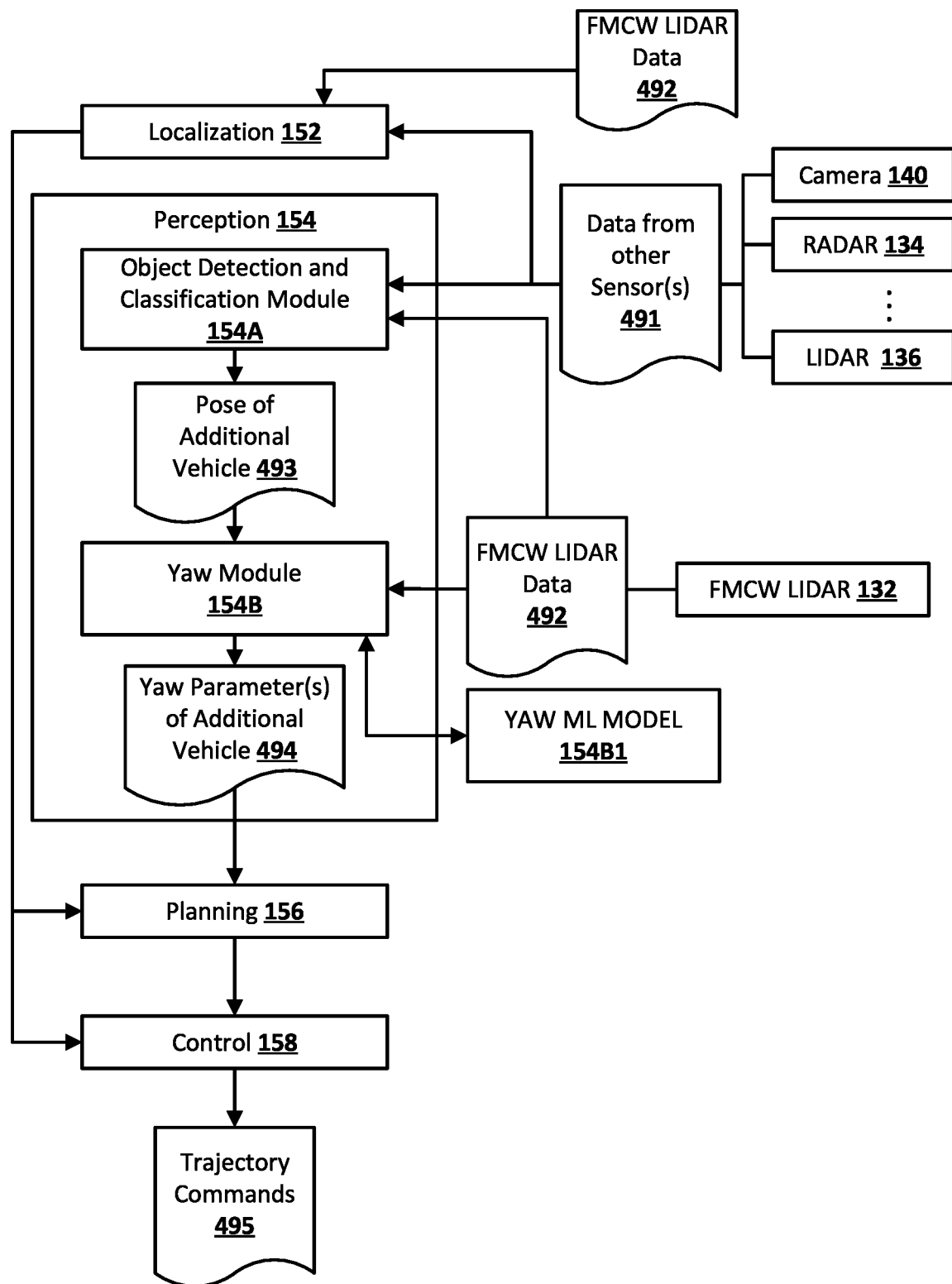
FIG. 4 is a block diagram illustrating implementations of adapting autonomous control of a vehicle based on a determined yaw parameter of an additional vehicle.

Turning now to FIG. 4, a block diagram is provided that illustrates implementations of adapting autonomous control of a vehicle based on a determined yaw parameter of an additional vehicle. FIG. 4 illustrates subsystems 152, 154, 156, and 158 of vehicle control system 120, and examples of how they may interact in determining a yaw parameter of an additional vehicle and/or adapting autonomous control based on the determined yaw parameter.

Localization subsystem 152 is generally responsible for localizing a vehicle within its environment. Localization subsystem 152, for example, may determine a pose (generally a position, and in some instances orientation) of the autonomous vehicle 100 within its surrounding environment. The localization subsystem 152 can determine the pose of the autonomous vehicle 100 utilizing FMCW LIDAR data 492 from FMCW LIDAR component 132 and/or data from other sensor(s) 491, such as camera 140, RADAR component 134, LIDAR component 136, and/or other sensors 130 of FIG. 1 (e.g., IMU 142, encoders 144). The pose determined by the localization subsystem 152 can be, for example, relative to a map utilized by the vehicle control system 120. The pose can be updated by the localization subsystem 152 as the vehicle 100 moves throughout its environment, and the pose provided to (or otherwise made accessible to) one or more of the other subsystems 154, 156, and/or 158 for use by the subsystem(s).

Perception subsystem 154 is principally responsible for perceiving dynamic objects such as pedestrians and additional vehicles within the environment, and may utilize FMCW LIDAR data 492 and optionally data from other sensor(s) 491 (e.g., camera 140, RADAR component 134) to identify and track dynamic objects. In tracking additional vehicle(s), the perception subsystem 154 can determine, at each of a plurality of iterations, various characteristics of the additional vehicle(s) such as their pose (position and/or location), as well as their absolute object velocity and/or yaw parameter(s) (e.g., yaw rate).

Perception subsystem 154 can include an object detection and classification module 154A that utilizes FMCW LIDAR data 492 and/or data from other sensor(s) 491 in detecting various objects (e.g., determining the pose of the objects) and optionally classifying the detected objects. For example, the object detection and classification module 154A can process FMCW LIDAR data 492 and/or data from other sensor(s) 491 in detecting and classifying additional vehicles, pedestrians, and/or other dynamic object in the environment of the vehicle 100. In various implementations, the object detection and classification module 154A can utilize one or more trained machine learning models in detecting and/or classifying various objects. For example, the trained machine learning model(s) can include a neural network model that is trained for utilization in processing FMCW LIDAR data (and/or other data) to generate, as output, an indication of a pose of object(s) indicated in the data and optionally corresponding classification(s) of the object(s). For instance, the output can indicate bounding boxes, bounding spheres, or other bounding areas for each of one or more objects detected in the data, optionally along with a corresponding classification for each of the bounding areas.

As one particular example, the FMCW LIDAR data 492 can include a 3D point cloud defining a corresponding range (via its 3D coordinate in the 3D point cloud), corresponding velocity, and optionally a corresponding intensity. The object detection and classification module 154A can process FMCW LIDAR data 492 using a trained machine learning model to generate output that indicates one or more bounding boxes that each correspond to a portion of the 3D point cloud that includes a detected object. In some implementations, the output can also indicate, for each of the bounding boxes, classification(s) to which the detected object belongs. For example, the output can indicate, for each of the bounding boxes, respective probabilities that the detected object is an additional vehicle, a pedestrian, an animal, etc. In some other implementations, the trained machine learning model can be trained to detect only additional vehicles, and can be utilized to generate output that indicates bounding box(es) and/or other bounding shape(s), without an explicit indication of the classification(s) for the bounding shape(s).

In some implementations, in detecting and/or classifying various objects, the object detection and classification module 154A can additionally or alternatively process FMCW LIDAR data 492 and/or data from other sensor(s) 491 without utilization of machine learning model(s). For example, nearest neighbor and/or other clustering techniques can be utilized to determine portions of data that likely correspond to additional vehicle(s) and/or other object(s).

Regardless of the technique(s) utilized, object detection and classification module 154A can provide an indication of a pose of an additional vehicle 493 to a yaw module 154B of the perception subsystem 154. The pose can be relative to a map utilized by the vehicle control system 120 and/or relative to the FMCW LIDAR data 492. The yaw module 154B uses the provided pose of the additional vehicle 493 to determine a subgroup of FMCW LIDAR data 492 that corresponds to the pose. Further, the yaw module 154B determines one or more yaw parameters for the additional vehicle 494 based on the subgroup of the FMCW LIDAR data 492.

The yaw module 154B can determine the yaw parameter(s) for the additional vehicle 494 based on magnitudes, and optionally directions, indicated by all or portions of the subgroup of the FMCW LIDAR data 492. For example, the yaw parameter module 154B can determine a yaw parameter that indicates whether a vehicle is experiencing yaw movement (e.g., at least a threshold degree of yaw movement) based on determining at least a threshold gradient in velocities is indicated by at least some of the subgroup of FMCW LIDAR data 492. For instance, if the subgroup of the FMCW LIDAR data 492 has a gradient in velocities of 4 m/s (e.g., velocities ranging from +2 m/s to −2 m/s or velocities ranging from +9 m/s to +5 m/s), the yaw parameter module 154B can determine that the vehicle is experiencing yaw movement based on the 4 m/s velocity gradient. On the other hand, if the subgroup of the FMCW LIDAR data 492 has a gradient in velocities of less than 0.1 m/s, the yaw parameter module 154B can determine that the vehicle is experiencing little or no yaw movement based on the low velocity gradient.

Also, for example, the yaw parameter module 154B can determine a yaw parameter for the additional vehicle based on velocities indicated by multiple sets of the subgroup of the FMCW LIDAR data 492. For instance, the yaw parameter module 154B can determine a velocity differential based on comparison of a velocity of a first set of the FMCW LIDAR data 492 to a velocity of a spatially offset second set of the FMCW LIDAR data 492. The yaw parameter module 154B can utilize the velocity differential as the yaw parameter, or can determine a yaw rate based on the velocity differential. In some implementations, the yaw parameter module 154B can determine the yaw rate based on the velocity differential and based on a determined distance between the first set and the second set. In some of those implementations, the yaw parameter module 154B can determine the yaw rate based on dividing the velocity differential by the distance (optionally multiplied by a constant), to determine a yaw rate in radians per second. In some versions of those implementations, the yaw parameter module 154B can determine a range of yaw rates. For example, a lower bound yaw rate can be based on dividing the velocity differential by the distance, and an upper bound yaw rate can be based on dividing the velocity differential by: the distance multiplied by a constant between 0 and 1, such as a value between 0.4 and 0.9, a value between 0.4 and 0.75, or a value between 0.4 and 0.7. For instance, if the velocity differential is 1 m/s and the distance is 1.5 m, a lower bound yaw rate can be 0.67 radians per second ((1 m/s)/(1.5 m)), whereas if the velocity differential is 1 m/s and the distance is a larger 4.0 m, a lower bound yaw rate can be 0.25 radians per second. The value for a constant can be based on, for example, the cosine of an angle, for the additional vehicle, relative to the ego vehicle. For example, an angle of the additional vehicle relative to the FMCW LIDAR receiver(s), which can be based on one or more of the angles, indicated by the FMCW LIDAR data, that correspond to the additional vehicle.

As one particular example, the first set can be a single data point, the velocity of the first set can be the velocity for the single data point, the second set can be a separate single data point, and the velocity of the second set can be the velocity for the separate single data point. The yaw parameter module 154B can determine a yaw rate based on the difference in the velocity magnitude of the first and second set (the velocity differential), and based on a determined distance between the first and second set. The yaw parameter module 154B can also determine a direction of the yaw movement (when the velocity differential is non-zero), based on comparison of the magnitudes of the velocities for the first and second sets (and optionally the directions in the case of an extreme yaw movement (e.g., loss of control of the additional vehicle)).

As another particular example, the yaw parameter module 154B can determine the yaw rate for the additional vehicle based on determining a first and second set of the FMCW LIDAR data, where the first set and the second set each include multiple corresponding data points. Further, the yaw rate module 154B can determine an average velocity, or other statistical measure (e.g., a mean) of the velocities of the data points of the first set, a statistical measure of the velocities of the data points of the second set, and determine the yaw rate based on comparing the statistical measure of the velocities for the first set and the statistical measures of the velocities for the second set. Additional description of these and other techniques for determining the yaw rate are provided herein. For example, additional description of various techniques is provided below in association with description of FIGS. 5 through 8.

In some implementations, the yaw parameter module 154B can additionally or alternatively determine a yaw rate for an additional vehicle based on velocities indicated by at least some of the subgroup of the FMCW LIDAR data 492, and based on a stored model for the additional vehicle. The stored model for the additional vehicle describes geometric features of the additional vehicle. The stored model can be, for example, a three-dimensional (3D) model of the additional vehicle. The yaw parameter module 154B can map velocities indicated by at least some of the subgroup of the FMCW LIDAR data 492 to corresponding locations on the stored model, and determine a yaw rate of the additional vehicle using the velocities and their locations on the stored model. For example, the yaw parameter module 154B can apply multiple velocities to the stored model to determine yaw rate of the stored model about the yaw axis with the applied velocities. The yaw parameter module 154B can determine this using, for example, a simulator that simulates movement of the stored model with the applied velocities.

In some implementations where a stored model of the additional vehicle is utilized, the yaw parameter module 154B can optionally utilize a generic stored model for all additional vehicles. In some other implementations, the yaw parameter module 154B can select the stored model for a given additional vehicle, from a plurality of candidate stored models, based on determining that selected stored model conforms most closely to sensor data that captures the additional vehicle. For example, the yaw parameter module 154B can select the stored model based on determining that the FMCW LIDAR data of a subgroup (determined to correspond to the additional vehicle) conforms to the selected model more closely than it does to any other of the stored models.

In some implementations, the yaw parameter module 154B can additionally or alternatively determine a yaw rate for an additional vehicle utilizing a trained yaw machine learning (ML) model 154B1. For example, the yaw parameter module 154B can process all or portions of FMCW LIDAR data 492 using the trained yaw ML model 154B1 to generate output that indicates the yaw rate. For instance, at least a subgroup of the FMCW LIDAR data 492 that is determined to correspond to the additional vehicle can be processed using the trained yaw ML model 154B1 to generate output that indicates the yaw rate. The trained yaw ML model 154B1 can be trained, for example, as described below with respect to method 1200 of FIG. 12.

The perception subsystem 154 provides the yaw parameter(s) for the additional vehicle 494 to the planning subsystem 156 (or otherwise makes it available to the planning subsystem 156). The planning subsystem 156 is principally responsible for planning out a trajectory of the vehicle over some time frame (e.g., several seconds), and may receive input from both localization subsystem 152 and perception subsystem 154. The planning subsystem 156 can adapt the trajectory of the vehicle based on the provided yaw parameter(s) of the additional vehicle 494. For example, if the yaw parameter(s) 494 indicate a velocity differential and/or yaw rate for the additional vehicle that exceeds a threshold that indicates the additional vehicle has lost control, the planning subsystem 154 can adapt the trajectory of the vehicle so as to evade the additional vehicle. Also, for example, if the yaw parameter(s) 494 indicate a yaw rate and yaw direction, the planning subsystem 154 can utilize the yaw rate and yaw direction for the additional vehicle 494 in determining one or more candidate trajectories for the additional vehicle, and can adapt the trajectory of the vehicle so that the vehicle does not contact and/or come within a threshold distance of the additional vehicle if the additional vehicle traverses one of the candidate trajectories. Additional description of these and other techniques for adapting control of a vehicle based on a determined yaw parameter(s) of an additional vehicle are provided herein. For example, additional description of some techniques is provided below in association with description of FIG. 9.

The trajectory and/or other data generated by the planning subsystem 156 in view of the determined yaw parameter(s) is then passed on to control subsystem 158 to convert the desired trajectory into trajectory commands 195 suitable for controlling the various vehicle controls 112, 114, and/or 116 in control system 110, with localization data also provided to control subsystem 158 to enable the control subsystem 158 to issue appropriate commands to implement the desired trajectory as the location of the vehicle changes over the time frame.

Figure 5:
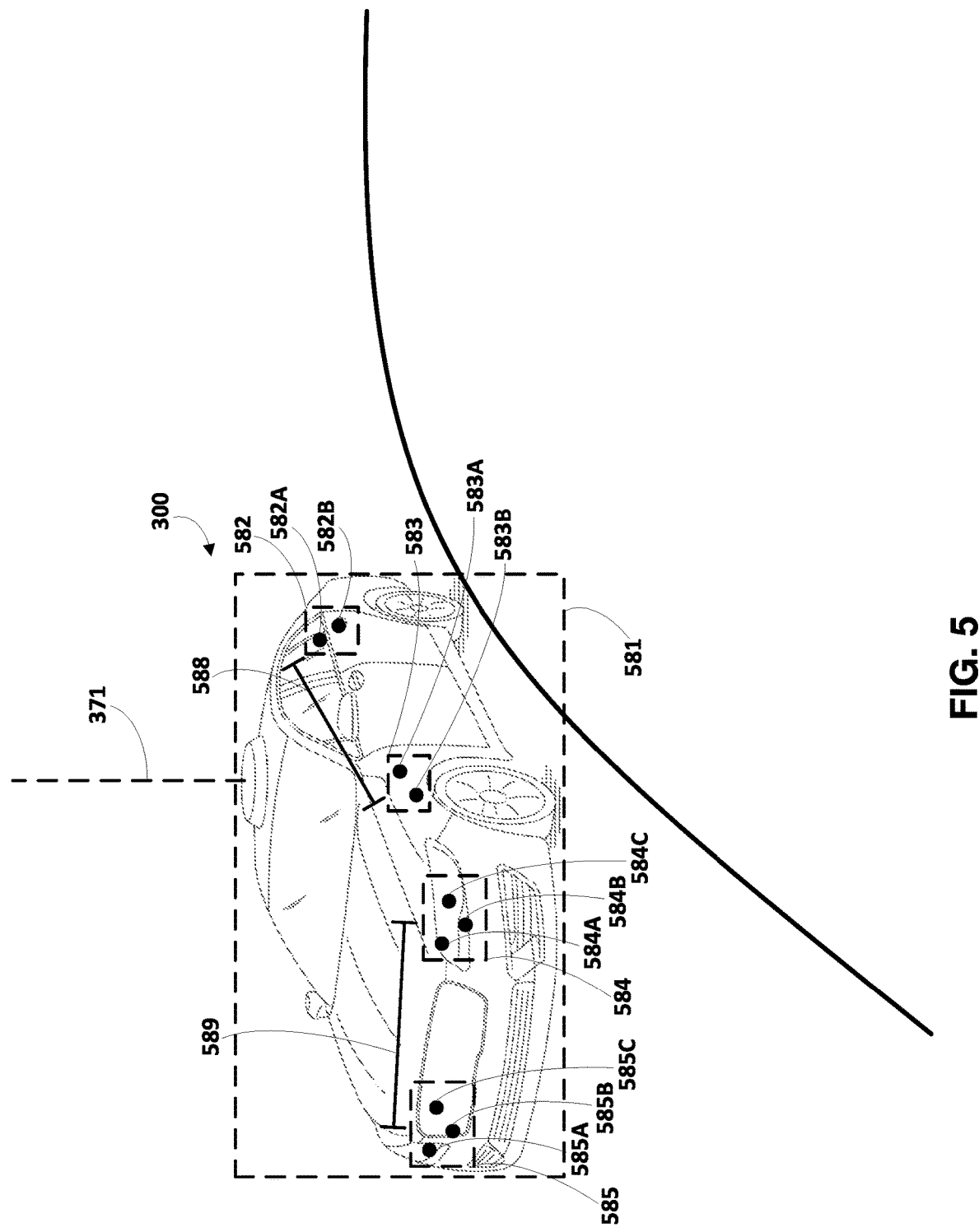
FIG. 5, FIG. 6, FIG. 7, and FIG. 8 each illustrate an example environment of a vehicle, where the environment includes an additional vehicle, and each also illustrate examples of some FMCW LIDAR data points that can correspond to the additional vehicle in the environment.

Turning now to FIGS. 5-8, they each illustrate an example environment of a vehicle, where the environment includes the additional vehicle 300. Further, each of FIGS. 5-8 also illustrate examples of some FMCW LIDAR data points that can correspond to the additional vehicle 300 in the environment. For example, FIG. 5 illustrates example FMCW LIDAR data points 582A-B, 583A-B, 584A-C, and 585A-C. The data points can be, for example, from an instance of FMCW LIDAR data that is a 3D point cloud, where each of the points of the 3D point cloud indicates a corresponding range (through its position in the 3D point cloud), and includes a corresponding rate/velocity, and optionally a corresponding intensity value. It is understood that additional FMCW LIDAR data points will be provided with the FMCW LIDAR data, including additional points that correspond to the vehicle 300—as well as additional points that correspond to additional environmental objects. However, only some of the FMCW LIDAR data points is illustrated in each of FIGS. 5-8 for simplicity. Moreover, it is understood that the vehicle 300 will not be rendered in the FMCW LIDAR data at it appears in FIGS. 5-8 (although it may be visually ascertainable via corresponding FMCW LIDAR data points). However, the vehicle 300 is illustrated in each of FIGS. 5-8 for reference purposes. Additionally, it is understood that while FIGS. 5-8 are described with respect to FMCW LIDAR data points, additional or alternative types of FMCW LIDAR data can be utilized in determining yaw parameter(s) of an additional vehicle, such as those also described herein.

In FIG. 5, a bounding box 581 is depicted around the additional vehicle 300. The bounding box 581 indicates a subgroup of FMCW LIDAR data that may correspond to the additional vehicle 300. The bounding box 581 can be determined, for example, by the object detection and classification module 154A of FIG. 4 based on processing of FMCW LIDAR data and/or other data to detect a vehicle and its pose. For example, the object detection and classification module 154A can process the FMCW LIDAR data using a machine learning model to generate output that indicates the FMCW LIDAR data points encompassed by bounding box 581 correspond to a vehicle. Illustrated within the bounding box 581 are example FMCW LIDAR data points. Namely, a first set 582 of data points 582A-B, a second set 583 of data points 583A-B, a third set 584 of data points 584A-C, and a fourth set of data points 585A-C.

The yaw parameter module 154B of FIG. 4 can determine a yaw parameter of the additional vehicle 300 based on comparison(s) between the first set 582, the second set 583, the third set 584, and/or the fourth set 585. For example, the yaw parameter module 154B can determine a statistical measure for the velocity for the first set 582 based on the velocities indicated by the data points 582A and 582B. For instance, if the data point 582A indicates a velocity of +3.1 m/s and the data point 582B indicates a velocity of +3.3 m/s, the yaw parameter module 154B can determine an average velocity of +3.2 m/s for the first set 582. Further, the yaw parameter module can also determine a statistical measure for the velocity for the second set 583 based on the velocities indicated by the data points 583A and 583B. For instance, if the data point 583A indicates a velocity of +3.8 m/s and the data point 583B indicates a velocity of +4.0 m/s, the yaw parameter module 154B can determine an average velocity of +3.9 m/s for the second set 583. The yaw parameter module 154B can then determine a velocity differential between the first set 582 and the second set 583. For instance, where the first set 582 and second set 583 have respective average velocities of +3.1 m/s and +3.9 m/s, the velocity differential can be 0.8 m/s. In some implementations, the velocity differential of 0.8 m/s can be utilized as a yaw parameter. Further, yaw parameter module 154B can also determine a direction of the yaw movement, based on comparison of the magnitudes of the velocities for the first set 582 and the second set 583. For instance, where the first set 582 and second set 583 have respective average velocities of +3.1 m/s and +3.9 m/s, a direction of the yaw movement (yaw direction) can be in the direction indicated by arrow 371A of FIG. 5.

In some implementations, a yaw parameter can additionally or alternatively include yaw rate(s) determined based on the velocity differential of 0.8 m/s. For example, at least an upper bound and a lower bound yaw rate can be determined based on the velocity differential of 0.8 m/s and based on a distance 588 that is based on the spatial offset between the first set 582 and the second set 583. The distance 588 can be, for example, a 3D distance between the average distance of points 582A and 582B, and the average distance of points 583A and 583B. As one example, if the distance 588 is 4.5 meters and the velocity differential is 0.8 m/s, a lower bound yaw rate can be 0.18 radians per second ((0.8 m/s)/(4.5 m)) and an upper bound yaw rate can be 0.36 radians per second ((0.8 m/s)/(4.5 m)(0.5)).

The yaw parameter module 154B can additionally or alternatively determine a statistical measure for the velocity for the third set 584, a statistical measure for the velocity for the fourth set 585, determine a velocity differential between the third set 584 and the fourth set 585, and determine a yaw parameter based on the velocity differential between the third set 584 and the fourth set 585. For example, a yaw parameter can be based on only the velocity differential between the third set 583 and the fourth set 584, or can be based on a combination (e.g., an average) of that velocity differential and the velocity differential between the first set 582 and the second set 583. Further, additional velocity differentials between additional sets (unillustrated sets and/ or different combinations of the illustrated sets) can be determined and utilized in determining yaw parameter(s).

Figure 6:
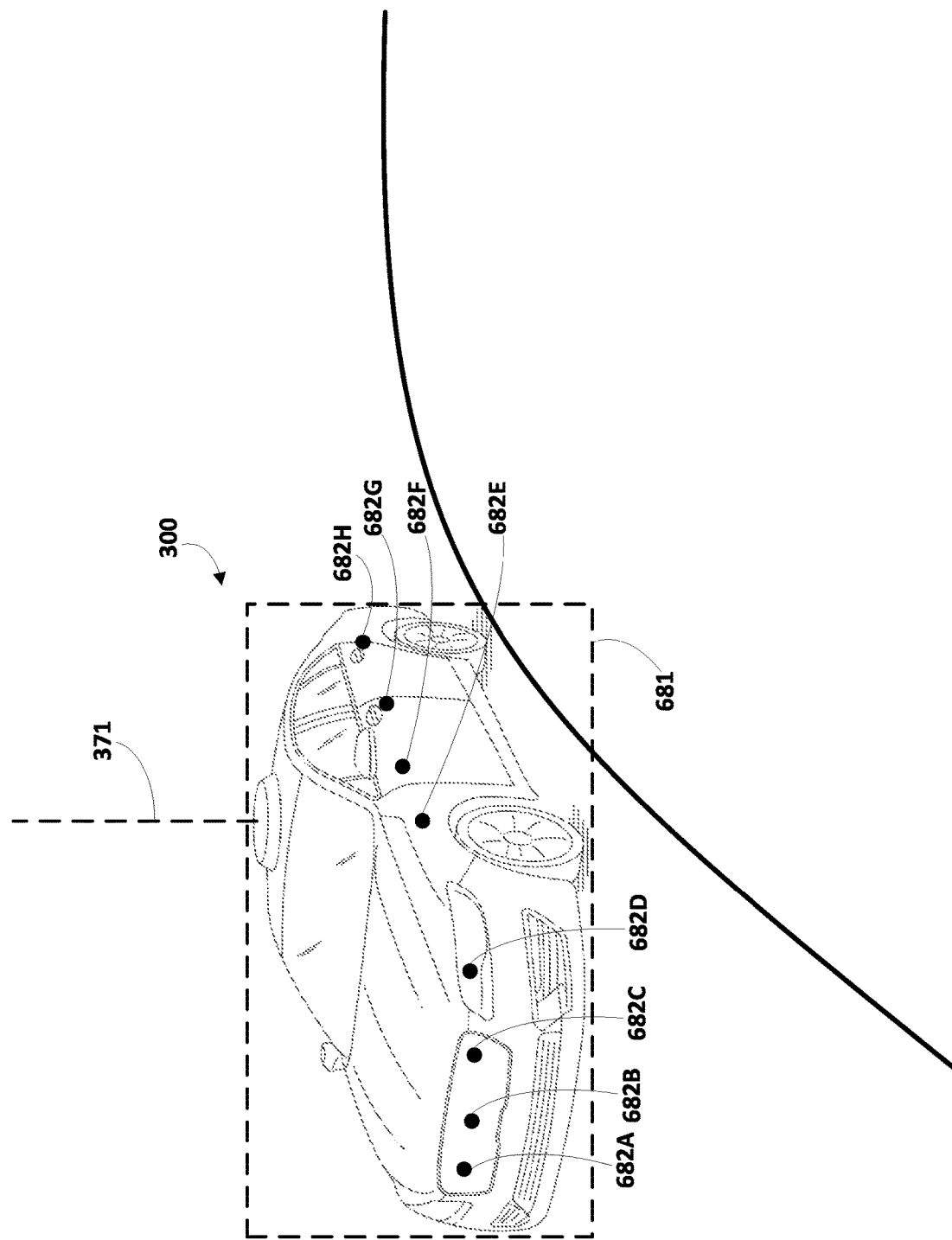

In FIG. 6, a bounding box 681 is depicted around the additional vehicle 300. The bounding box 681 indicates a subgroup of FMCW LIDAR data that may correspond to the additional vehicle 300. The bounding box 681 can be determined, for example, by the object detection and classification module 154A of FIG. 4 based on processing of FMCW LIDAR data and/or other data to detect a vehicle and its pose. Illustrated within the bounding box 681 are example FMCW LIDAR data points 682A-H.

The yaw parameter module 154B of FIG. 4 can determine a yaw parameter of the additional vehicle 300 based on comparison(s) between two or more of the FMCW LIDAR data points 682A-H. For example, the yaw parameter module 154B can determine: a first yaw rate (or first lower and upper bound yaw rates) based on a first velocity differential between the velocities indicated by the data points 682E and 682H, and a determined distance between data points 682E and 682H; a second yaw rate (or second lower and upper bound yaw rates) based on a second velocity differential between the velocities indicated by the data points 682F and 682H, and a determined distance between data points 682F and 682H; a third yaw rate (or third lower and upper bound yaw rates) based on a third velocity differential between the velocities indicated by the data points 682A and 682D, and a determined distance between data points 682A and 682D; etc. Continuing with the example, the yaw parameter module 154B can then determine an overall yaw rate (or overall lower and upper bound yaw rates) based on a combination of the multiple yaw rates (or combinations of multiple lower bound yaw rates and combinations of multiple upper bound yaw rates). Further, yaw parameter module 154B can also determine a direction of the yaw movement, based on comparison of the magnitudes of one or more of the data point pairs.

Figure 7:
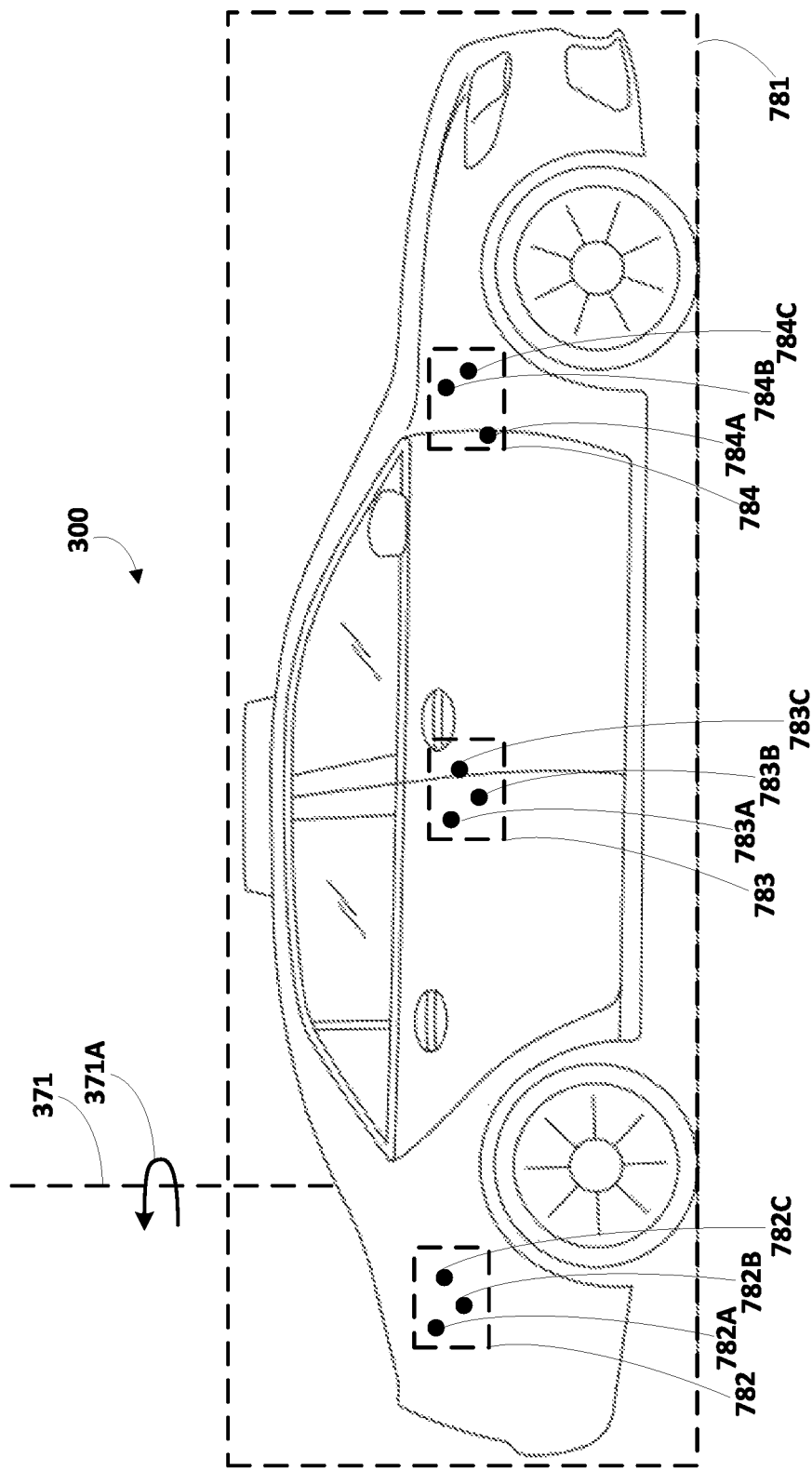

In FIG. 7, the additional vehicle 300 is illustrated at a pose (relative to the FMCW LIDAR component) that it is different than that illustrated in FIGS. 5 and 6. Namely, in FIG. 7 the additional vehicle 300 is perpendicular to the FMCW LIDAR component. A bounding box 781 is depicted around the additional vehicle 300 in FIG. 7, and indicates a subgroup of FMCW LIDAR data that may correspond to the additional vehicle 300. Illustrated within the bounding box 781 are example FMCW LIDAR data points 782A and 782B.

Since the additional vehicle 300 is perpendicular in FIG. 7, the data points 782A and 782B will indicate zero (or near zero) velocities if the additional vehicle 300 is not undergoing yaw motion. If, on the other hand, the additional vehicle 300 is undergoing yaw motion, the data points 782A and 782B will indicate non-zero velocities. The yaw parameter module 154B of FIG. 4 can determine a yaw parameter of the additional vehicle 300 based on comparison(s) between the data points 782A and 782B. For example, the yaw parameter module 154B can determine whether the additional vehicle 300 is undergoing yaw motion based on determining that a first velocity differential between the velocities indicated by the data points 782A and 782B satisfies a threshold.

Figure 8:
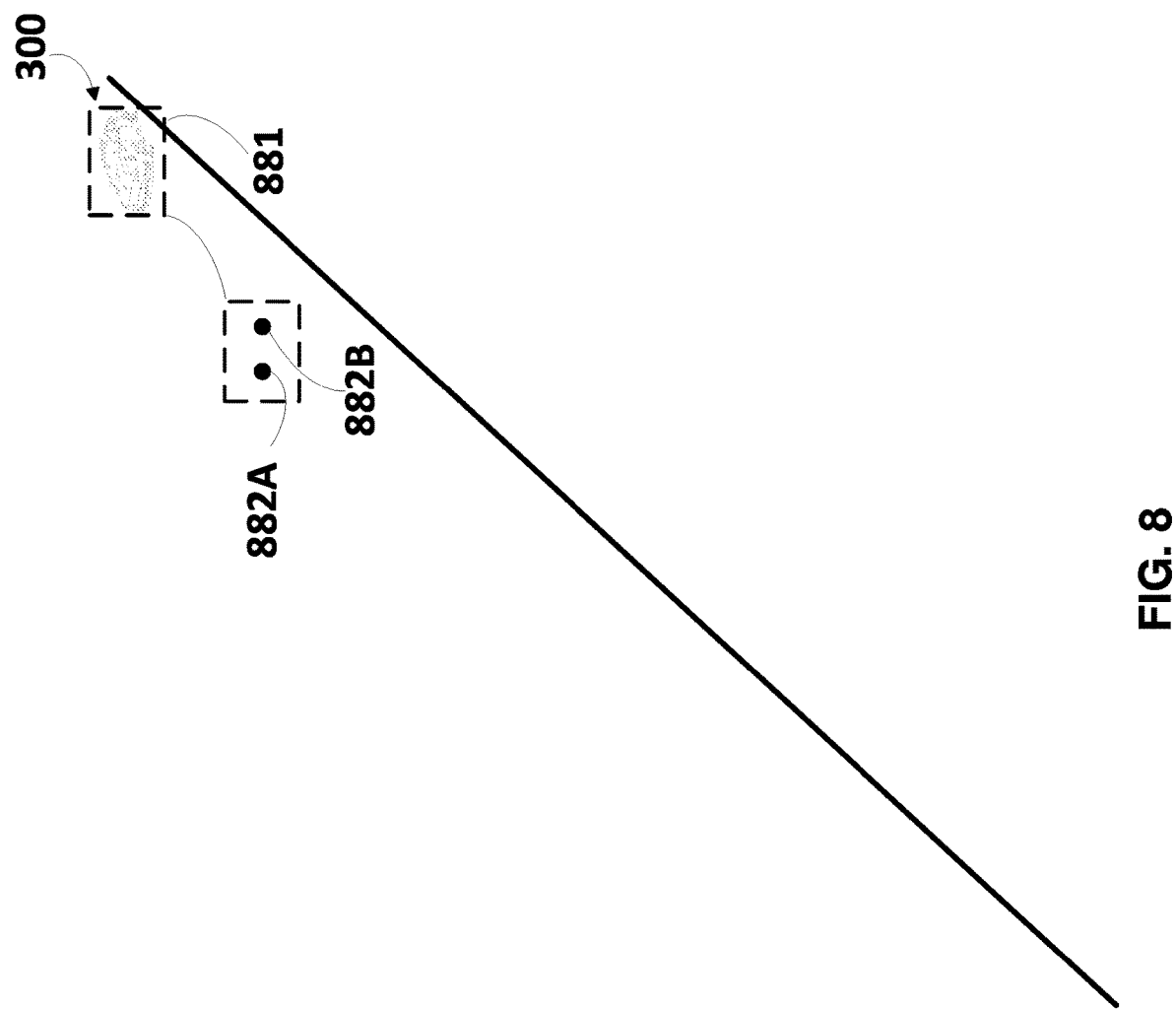

In FIG. 8, a bounding box 881 is depicted around the additional vehicle 300, and bounding box 881 indicates the only two FMCW LIDAR data points 882A and 882B that correspond to the additional vehicle 300. In FIG. 8, the additional vehicle 300 is far away from the FMCW LIDAR component. The FMCW LIDAR data points 882A and 882B in FIG. 8 can be FMCW LIDAR monopulse data points generated by an FMCW LIDAR monopulse component. The example of FIG. 8 is one example of where FMCW LIDAR monopulse data points can be particularly beneficial. Namely, it illustrates a situation where the increased angular accuracy of the FMCW LIDAR monopulse component enables two FMCW LIDAR data points 882A and 882B to be determined, whereas one (or none) may have been determinable with a FMCW LIDAR (non-monopulse component). While FIG. 8 is one example, it is noted that FMCW LIDAR data points of FIGS. 5-7 can also be FMCW LIDAR monopulse data points and can also be beneficial since, for example, it increases the angular accuracy of FMCW LIDAR data for the additional vehicle 300 that can be utilized in determining yaw rate according to implementations disclosed herein. Such increased angular accuracy of FMCW LIDAR data can result in more accurate yaw rate determination in some implementations.

The yaw parameter module 154B of FIG. 4 can determine a yaw parameter of the additional vehicle 300 based on a comparison of the FMCW LIDAR data points 882A and 882B. For example, the yaw parameter module 154B can determine a yaw rate based on a velocity differential between the velocities indicated by the data points 882A and 882B, and a determined distance between data points 882A and 882B. Further, yaw parameter module 154B can also determine a direction of the yaw movement, based on comparison of the magnitudes of the velocities for data points 882A and 882B.

Yaw parameters determined according to techniques described herein can be utilized in adapting control of an ego vehicle. One example of such adaptation is described with respect to FIG. 9, which illustrates an example of how a candidate trajectory of the additional vehicle 300 can be determined based on a determined yaw parameter, and how autonomous control of the vehicle 100 can be adapted based on the candidate trajectory of the additional vehicle 300.

Figure 9:
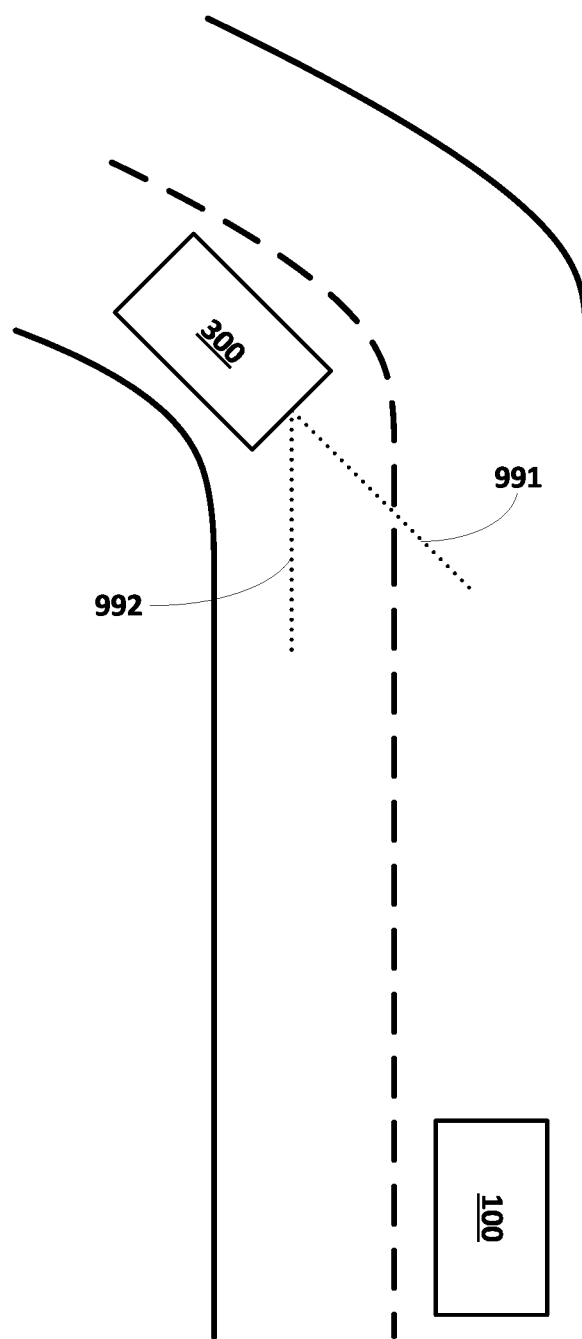
FIG. 9 illustrates an example of how a candidate trajectory of an additional vehicle can be determined based on a determined yaw parameter, and how autonomous control of a vehicle can be adapted based on the candidate trajectory of the additional vehicle.

In FIG. 9, the vehicle 100 can utilize FMCW LIDAR data, from an FMCW LIDAR component of the vehicle 100, to determine a yaw rate of the additional vehicle 300 at a given instance. Candidate trajectory 991 illustrates a candidate trajectory that can be determined if the determined yaw rate is zero, or near zero. Candidate trajectory 991 can be determined based on a determined absolute object velocity direction and magnitude of the additional vehicle 300, without any modification based on a yaw rate (since the determined yaw rate is zero, or near zero).

On the other hand, candidate trajectory 992 illustrates a candidate trajectory that can be determined if the determined yaw rate indicates yaw movement of the vehicle in a yaw direction that is a clockwise direction relative to the birds-eye view of FIG. 9. The candidate trajectory 992 can be determined as a function of the determined absolute velocity direction and magnitude, and the determined magnitude and direction of the determined yaw rate. Various techniques can be utilized to determine the absolute object velocity, such as tracking of the additional vehicle over multiple instances of sensor data (e.g., FMCW LIDAR data and/or other data). Although only a single candidate trajectory 992 is illustrated in FIG. 9, in some implementations multiple candidate trajectories can be determined. For example, where a lower and upper bound yaw rate are determined as described herein, a first candidate trajectory can be determined based on the lower bound yaw rate and a second candidate trajectory can be determined based on the upper bound yaw rate, and a plurality of trajectories that are between the first and second candidate trajectories (and optionally the first and second candidate trajectories themselves) can be considered as candidate trajectories of the additional vehicle 300 (e.g., a zone of candidate trajectories).

As can be appreciated from viewing FIG. 9, if the candidate trajectory 991 is determined for the vehicle 300, it may be necessary to adapt control of the vehicle 100 to evade the additional vehicle 300 (as the additional vehicle 300 would cross into the lane of vehicle 100 if it traversed the candidate trajectory 991). On the other hand, evasive adaptive control of the vehicle may not be necessary if the candidate trajectory 992 is instead determined.

FIG. 9 illustrates candidate trajectories that can be determined for a given instance based on a determined yaw rate for the given instance. Yaw rates and candidate trajectories will continue to be generated at each of a plurality of additional instances (e.g., updated yaw rates and candidate trajectories can be generated at each control cycle (e.g., at 60 Hz and/or other rate), thereby enabling candidate trajectories to be continuously updated in view of changing yaw rates. Moreover, in generating a candidate trajectory at a given instance, one or more candidate trajectories and/or one or more yaw rates from one or more prior instances can be considered so as to smooth the candidate trajectory at the given instance and prevent unnecessary evasive adaptation based on, for example, an errantly determined yaw rate (e.g., based on noisy data) and/or a brief and intermittent yaw rate change.

Figure 10:
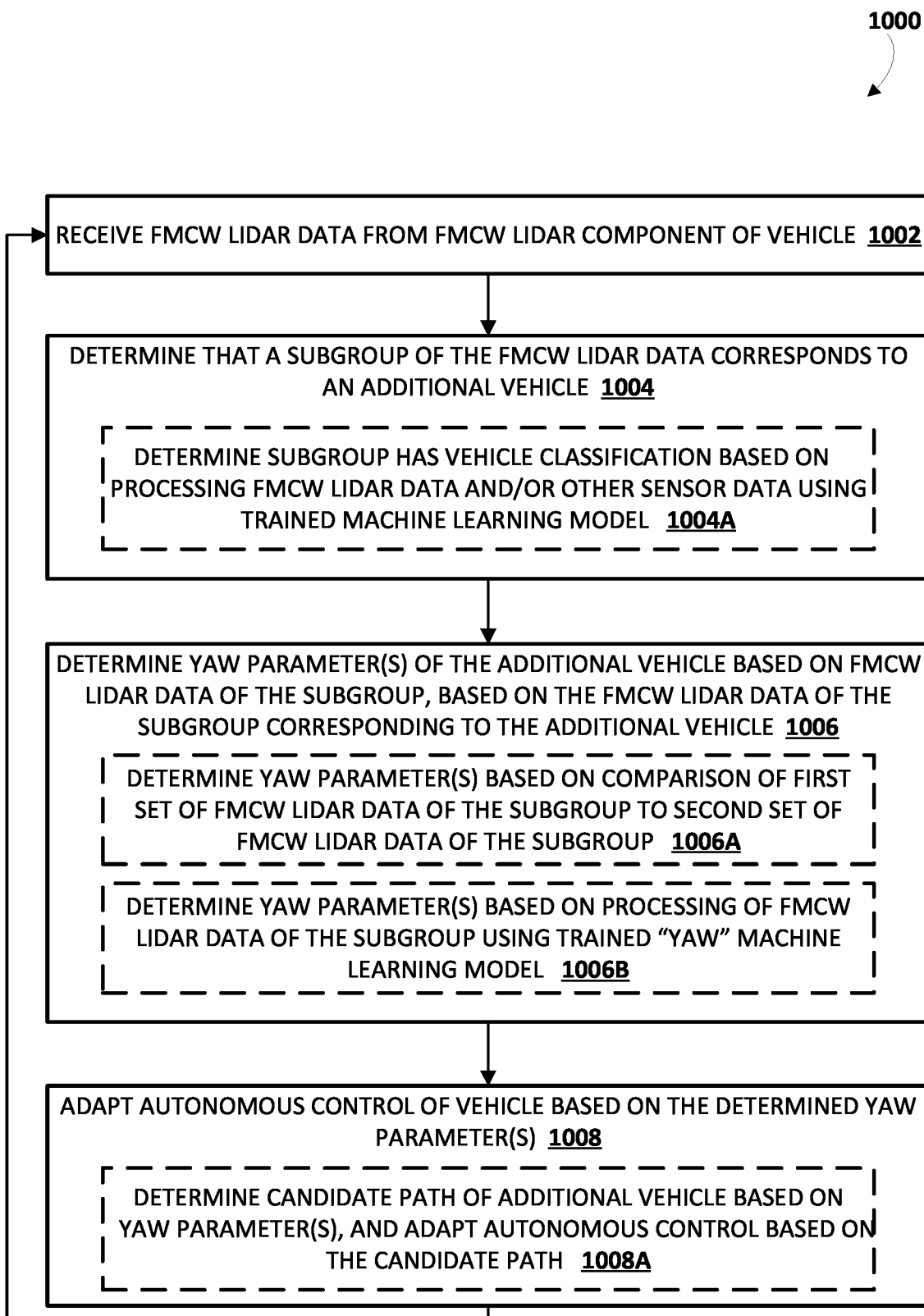
FIG. 10 is a flowchart illustrating an example method of determining a yaw parameter and controlling an autonomous vehicle based on the determined yaw parameter.

Turning now to FIG. 10, a flowchart is provided illustrating an example method 1000 of determining a yaw parameter and controlling an autonomous vehicle based on the determined yaw parameter. For convenience, the operations of the flow chart are described with reference to a system that performs the operations. This system may include various components, such as one or more processors of the autonomous vehicle 100 of FIG. 1. Moreover, while operations of method 1000 are shown in a particular order, this is not meant to be limiting. One or more operations may be reordered, omitted or added.

At block 1002, the system receives FMCW LIDAR data from an FMCW LIDAR component of a vehicle. The received FMCW LIDAR data at an iteration of block 1002 can be a most recent unprocessed (unprocessed using method 1000) instance of data generated by the FMCW LIDAR component. The instance of data can be generated by the FMCW LIDAR component during a sensing cycle and can be received by the system, for example, as part of a stream, as data packet(s), or via accessing shared memory.

At block 1004, the system determines that a subgroup of the FMCW LIDAR data corresponds to an additional vehicle. Block 1004 can optionally include sub-block 1004A, where the system determines the subgroup has a vehicle classification based on processing the FMCW LIDAR data and/or other sensor data using a trained machine learning model. In some implementations, sub-block 1004A can be omitted, and the system can determine that the subgroup corresponds to an additional vehicle without utilization of machine learning model(s). For example, the system can utilize nearest neighbor and/or other clustering techniques to determine that a subgroup of FMCW LIDAR data likely corresponds to the additional vehicle.

At block 1006, the system determines one or more yaw parameters of the additional vehicle based on FMCW LIDAR data of the subgroup. The system determines the yaw parameter(s) based on the FMCW LIDAR data of the subgroup, based on the FMCW LIDAR data of the subgroup corresponding to the additional vehicle.

Block 1006 can optionally include sub-block 1006A and/or sub-block 1006B. At sub-block 1006A, the system determines yaw parameter(s) based on comparison of a first set of FMCW LIDAR data of the subgroup to a second set of FMCW LIDAR data of the subgroup. For example, the system can determine a yaw rate based on a velocity differential between the first set and the second set, and based on a 3D distance between the first set and the second set. The system can determine the yaw parameter(s) based on comparison of the first and second sets alone, or also based on additional comparison(s) of additional set(s).

At sub-block 1006B, the system determines yaw parameter(s) based on processing of FMCW LIDAR data of the subgroup using a trained yaw machine learning model. For example, the system can process all or portions of FMCW LIDAR data of the subgroup using the trained yaw machine learning model to generate output that indicates the yaw rate. The trained yaw machine learning model can be trained, for example, as described below with respect to method 1200 of FIG. 12.

In some implementations, the system determines the yaw parameter(s) using only one of sub-block 1006A and sub-block 1006B. In other implementations, the system determines yaw parameter(s) using both sub-block 1006A and sub-block 1006B. For example, the system can determine a first yaw rate based on sub-block 1006A, a second yaw rate based on sub-block 1006B, and determine a final yaw rate based on a combination of the first yaw rate and the second yaw rate. Although sub-blocks 1006A and 1006B are illustrated in FIG. 10, it is understood that additional and/or alternative sub-blocks can be included in block 1006, such as a sub-block that determines a yaw parameter utilizing a stored 3D model of the additional vehicle.

At block 1008, the system determines whether to adapt autonomous control of a vehicle based on the determined yaw parameter(s). For example, the system can selectively adapt autonomous steering and/or acceleration/deceleration based at least in part on the determined yaw parameter(s). Block 1008 can optionally include sub-block 1008A, in which the system determines a candidate trajectory of the additional vehicle based on the determined yaw parameter(s), and determines whether to adapt autonomous control of the vehicle based on the candidate trajectory. For example, the system can adapt autonomous control of the vehicle if the candidate trajectory of the additional vehicle, and the current intended trajectory of the vehicle, indicate the additional vehicle and/or the additional vehicle indicate a potential for collision between the vehicle and the additional vehicle.

After block 1008, the system proceeds back to block 1002, where it receives new FMCW LIDAR data (e.g., the most recently generated data that has not yet been processed using method 1000), and then proceeds to perform another iteration of blocks 1002, 1004, 1006, and 1008. Although illustrated serially in FIG. 10, a next iteration of block(s) 1002, 1004, and/or 1006 can be performed in parallel with a prior iteration of one or more subsequent blocks (e.g., via multiple processor(s) and/or threads). Through continual iterations of the blocks of FIG. 10 while the vehicle is navigating, yaw parameter(s) of additional vehicles can be continuously determined and updated (when additional vehicle(s) are present), and autonomous control of the vehicle selectively adapted based on the yaw parameter(s).

Figure 11:
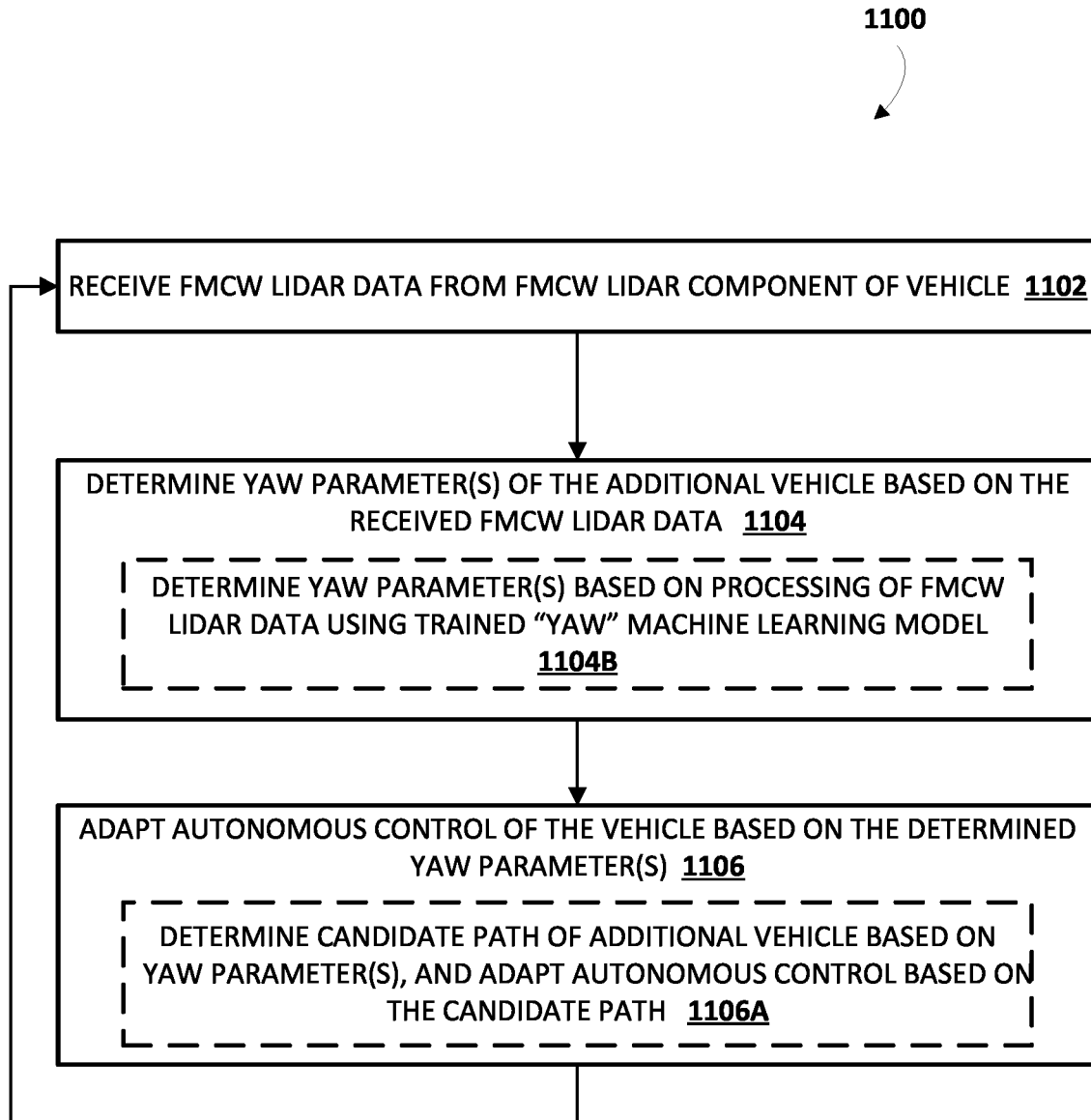
FIG. 11 is a flowchart illustrating another example method of determining a yaw parameter and controlling an autonomous vehicle based on the determined yaw parameter.

Turning now to FIG. 11, a flowchart is provided illustrating another example method 1100 of determining a yaw parameter and controlling an autonomous vehicle based on the determined yaw parameter. For convenience, the operations of the flow chart are described with reference to a system that performs the operations. This system may include various components, such as one or more processors of the autonomous vehicle 100 of FIG. 1. Moreover, while operations of method 1100 are shown in a particular order, this is not meant to be limiting. One or more operations may be reordered, omitted or added.

At block 1102, the system receives FMCW LIDAR data from an FMCW LIDAR component of a vehicle. As one non-limiting working example, the FMCW LIDAR data can be a range-Doppler image.

At block 1104, the system determines yaw parameter(s) of the additional vehicle based on the received FMCW LIDAR data. Block 1104 can optionally include sub-block 1004A, at which the system determines yaw parameter(s) based on processing of the FMCW LIDAR data using a trained yaw machine learning model. Continuing with the working example, the system can process all or portions of the range-Doppler image using the trained yaw machine learning model to generate output that indicates at least yaw rate(s) of additional vehicle(s) captured in the range-Doppler image. For example, the system can process the entirety of the range-Doppler image to generate output that indicates yaw rate(s) of additional vehicle(s), along with indication(s) of the position(s) of the additional vehicle(s) in the range-Doppler image. Also, for example, the system can process a portion of the range-Doppler image that corresponds to a single additional vehicle, and generate output that indicates a yaw rate of the single additional vehicle. The trained yaw machine learning model can be trained, for example, as described below with respect to method 1200 of FIG. 12.

At block 1106, the system determines whether to adapt autonomous control of a vehicle based on the determined yaw parameter(s). Block 1106 can optionally include sub-block 1106A, in which the system determines a candidate trajectory of the additional vehicle based on the determined yaw parameter(s), and determines whether to adapt autonomous control of the vehicle based on the candidate trajectory.

After block 1106, the system proceeds back to block 1102, where it receives new FMCW LIDAR data (e.g., the most recently generated data that has not yet been processed using method 1100), and then proceeds to perform another iteration of blocks 1104 and 1106. Although illustrated serially in FIG. 11, a next iteration of block(s) 1102, 1104, and/or 1106 can be performed in parallel with a prior iteration of one or more subsequent blocks (e.g., via multiple processor(s) and/or threads). Through continual iterations of the blocks of FIG. 11 while the vehicle is navigating, yaw parameter(s) of additional vehicles can be continuously determined and updated (when additional vehicle(s) are present), and autonomous control of the vehicle selectively adapted based on the yaw parameter(s).

Figure 12:
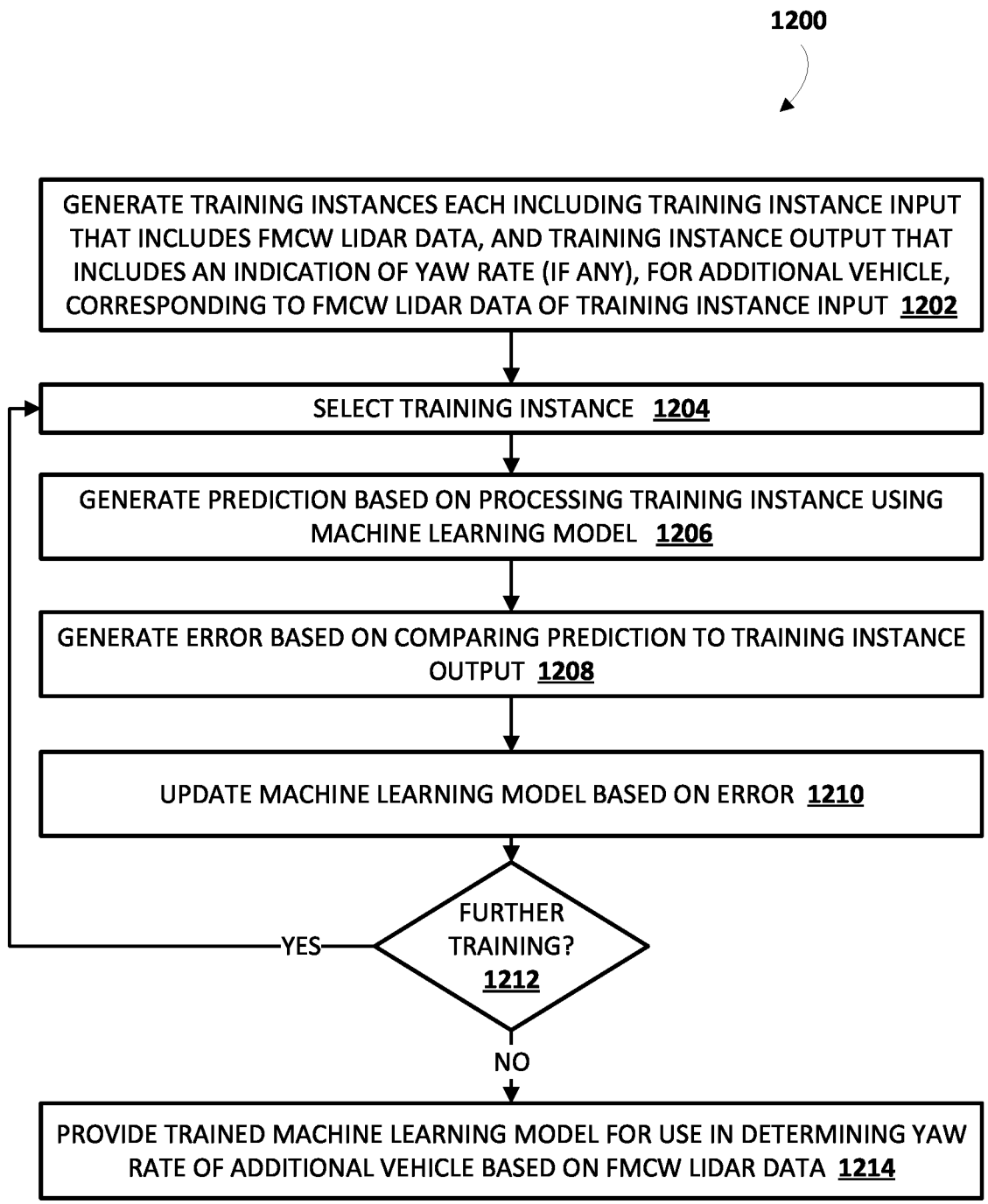
FIG. 12 is a flowchart illustrating an example method of training a machine learning model that can be utilized in determining yaw rate based on FMCW LIDAR data.

Turning now to FIG. 12, a flowchart is provided illustrating an example method 1200 of training a machine learning model that can be utilized in determining yaw rate based on FMCW LIDAR data. For convenience, the operations of the flow chart are described with reference to a system that performs the operations. This system may include various components, such as one or more processors of one or more computing devices, such as one or more graphics processing units of one or more computing devices. Moreover, while operations of method 1200 are shown in a particular order, this is not meant to be limiting. One or more operations may be reordered, omitted or added.

At block 1202, the system generates training instances that each include training instance input and training instance output. The training instance input includes FMCW LIDAR data. The training instance output includes an indication of yaw rate(s), for additional vehicle(s), corresponding to the FMCW LIDAR data of the training instance input. The additional vehicle(s) can include additional autonomous vehicle(s) and/or non-autonomous vehicle(s).

As one particular example, the training instance input of each training instance can include the entirety of FMCW LIDAR data of an instance. For instance, each training instance input can be a corresponding range-Doppler image, a corresponding 3D point cloud (with velocity values and intensity values), or a corresponding time varying intermediate frequency (IF) waveform. The training instance output of each training instance in such a particular example can include, for example: bounding box(es) (or other bounding indication), if any, that each indicate a portion of the FMCW LIDAR data that includes an additional vehicle; and a yaw rate and yaw direction for each of the bounding box(es) (if any). For instance, for a first training instance having training instance input with FMCW LIDAR data that does not capture any additional vehicle, the training instance output can indicate no bounding indications. Also, for instance, for a second training instance having training instance input with FMCW LIDAR data that captures a single additional vehicle, the training instance output can indicate a single bounding indication that indicates that portion of the FMCW LIDAR data that corresponds to the single additional vehicle, along with a yaw rate and yaw direction for that bounding indication. Also, for instance, for a third training instance having training instance input with FMCW LIDAR data that captures multiple additional vehicles, the training instance output can indicate multiple bounding indications that each indicate that portion of the FMCW LIDAR data that corresponds to a corresponding one of the multiple additional vehicles, along with a corresponding yaw rate and corresponding yaw direction for each of the bounding indications.

As another particular example, the training instance input of each training example can include a subgroup of FMCW LIDAR data of an instance, where the subgroup of FMCW LIDAR data is selected based on determining that it corresponds to an additional vehicle (e.g., based on processing the FMCW LIDAR data of the instance using a separate trained object detection and classification machine learning model). Since the subgroup of FMCW LIDAR data that corresponds to an additional vehicle can vary from instance to instance (e.g., based on a respective pose of the additional vehicle at the instance), one or more techniques can be utilized to generate training instance inputs that are each of the same dimension. For example, padding data can be added to a subgroup that is less than the dimension. Also, for example, the FMCW LIDAR data can be upsampled (when less than the dimension) or downsampled (when less than the dimension). The training instance output of each training instance in such a particular example can include, for example, a yaw rate and yaw direction.

The yaw rate for an additional vehicle for a training instance output of a training instance can be based on a determination of the yaw rate at a time that corresponds to the capture time of the FMCW LIDAR data for the training instance. In some implementations and for at least some training instances, the yaw rate can be determined based on output from on-vehicle yaw rate sensor(s) of the additional vehicle. For example, the output from the on-vehicle yaw rate sensor(s) can be time-synchronized with the FMCW LIDAR data and utilized to assign yaw rate and yaw direction to each of a plurality of FMCW LIDAR data instances. In these implementations it is noted that the on-vehicle yaw rate sensor(s) of the additional vehicle can be utilized in generating training instance outputs of training instances utilized to train the yaw machine learning model. However, at inference time yaw rate predictions of an additional vehicle can be generated, using the trained yaw machine learning model, without any utilization of data from yaw rate-sensors of the additional vehicle. For example, at inference time a yaw rate prediction at a given instance can be generated based on processing of only FMCW LIDAR data for the given instance, using the trained yaw machine learning model.

In various implementations, the output from the on-vehicle yaw rate sensor(s) of the additional vehicle, that are used in generating the training instance output, can be determined based on monitoring of data from a Controller Area Network (CAN bus) of the additional vehicle, or other communication network of the additional vehicle that includes data from the yaw rate sensor(s). In some of those various implementations, a laptop computer or other computing device can be incorporated in or on the additional vehicle, during movement of the additional vehicle, and can be coupled to the communication network of the additional vehicle to log yaw rate sensor data and/or other data transmitted over the communication network. In additional or alternative implementations, the on-vehicle yaw rate sensor(s) of the additional vehicle can be stand-alone sensors of the additional vehicle that are not in communication with the CAN bus and/or other integral communication network of the additional vehicle. For example, an equipment package that includes the yaw rate sensor(s) and a computing device can be incorporated in or on the additional vehicle, during movement of the additional vehicle, and the computing device can be communicatively coupled with the yaw rate sensor(s) to log and timestamp sensor data from the sensor(s).

Various techniques can be utilized to time-synchronize output from the on-vehicle yaw rate sensor(s) (of the additional vehicle) with the FMCW LIDAR data (of the autonomous vehicle), to enable assigning of a given yaw rate and given yaw direction to a corresponding FMCW LIDAR data instance. For example, computing device(s) of the additional vehicle that log yaw rate data from the additional vehicle can timestamp the yaw rate data using a local clock of the computing device(s). Likewise, a local clock of the autonomous vehicle can timestamp FMCW LIDAR data. The timestamps of the yaw rate data and the timestamps of the FMCW LIDAR data can be utilized to pair FMCW LIDAR data instances and corresponding yaw rate data. For example, the local clocks may have been recently synchronized prior to collecting the data, and the timestamps assumed to be synchronous. Also, for example, a delta between the local clocks can be determined (before or after collecting the data), and the delta utilized to determine which timestamps of FMCW LIDAR data correspond to which timestamps of yaw rate data.

In some additional or alternative implementations, and for at least some training instances, the yaw rate can be determined based on automated yaw rate determination techniques that determine the yaw rate at a given instance based at least in part on analysis of one or more previous and/or subsequent instances of FMCW LIDAR data (and/or other sensor data) that captures the additional vehicle. In these implementations it is noted that previous and/or subsequent instances of FMCW LIDAR data can be utilized in generating training instance outputs of training instances utilized to train the yaw machine learning model. However, at inference time yaw rate predictions of an additional vehicle can be generated for a given instance, using the trained yaw machine learning model and FMCW LIDAR data for the given instance, and without utilizing previous and/or subsequent FMCW LIDAR data. For instance, at inference time a yaw rate prediction at a given instance can be generated based on processing of FMCW LIDAR data for the given instance, using the trained yaw machine learning model, and without processing of any subsequent FMCW LIDAR data (and optionally before subsequent FMCW LIDAR data has even been generated and/or received).

At block 1204, the system selects a training instance, of the training instances generated at block 1202.

At block 1206, the system generates a prediction based on processing of the training instance input of the instance using a machine learning model. In some implementations, the machine learning model can be a neural network model, such as a feed-forward neural network model. For example, the machine learning model can be a feed-forward convolutional neural network (CNN) that includes one or more convolutional layers.

At block 1208, the system generates a loss based on comparing the prediction to the training instance output of the training instance. For example, an error can be determined based on a difference between the prediction and the training instance output, and the loss determined based on a magnitude of the error.

At block 1210, the system updates the machine learning model based on the loss. For example, the system can update weight(s) of perceptron(s) of the machine learning model by performing backpropagation of the machine learning model based on the loss.

At block 1212, the system determines whether to perform further training. If the system determines to perform further training, the system performs another iteration of blocks 1204, 1206, 1208, and 1210. In some implementations, the system determines to perform further training if there are any unprocessed training instances remaining. In some implementations, the system determines whether to perform further training based on one or more additional or alternative criteria. For example, the system can determine whether to perform further training based on whether a threshold number of training epochs have been performed, based on determining that recent predictions generated using the machine learning model satisfy a criterion, and/or based on other criterion/criteria.

If, at block 1214, the system determines not to perform further training, the system proceeds to block 1214. At block 1214, the system provides the trained machine learning model for use in determining yaw rate of an additional vehicle based on FMCW LIDAR data. For example, the system can provide the trained machine learning model for use in the method 1000 of FIG. 10, or the method 1100 of FIG. 11.

Although method 1200 is described with respect to generating a loss based on the prediction and the training instance output of a single training instance, in various implementations batch techniques can be utilized in which the loss is determined based on a batch of predictions and training instance output, of a batch of training instances. For example, multiple iterations of blocks 1204 and 1206 can be performed prior to each iteration of block 1208, and at each iteration of block 1208 the system can generate the loss based on the most recent iterations of blocks 1204 and 1206.

As described herein, a trained machine learning model trained according to implementations of method 1200 of FIG. 12 can be utilized to determine yaw parameter(s) of an additional vehicle. As further described, some implementations of the trained machine learning model can be used to process LIDAR data and generate, based on processing of the LIDAR data, output that directly or indirectly indicates yaw parameter(s) for an additional vehicle captured by the LIDAR data. In some of those implementations, the processed LIDAR data can be a subset of LIDAR data that has been determined to correspond to the additional vehicle. For example, an additional trained machine learning model can be utilized to detect a portion of LIDAR data that corresponds to an additional vehicle, and that portion of LIDAR data processed using the trained machine learning model. As further described, various implementations of the trained machine learning model can be used to process LIDAR data and generate, based on processing of the LIDAR data, output that indicates bounding indication(s) that each indicate that portion of the FMCW LIDAR data that corresponds to a corresponding vehicle, along with a corresponding yaw rate and corresponding yaw direction for each of the bounding indication(s). Accordingly, in those various implementations the trained machine learning model can be trained to be utilized in performing additional vehicle detection, as well as determining yaw parameter(s) for the detected additional vehicle(s).

Method 1200 of FIG. 12 is described with respect to training a machine learning model that can be utilized in determining yaw rate based on FMCW LIDAR data. However, in many implementations method 1200 can be adapted to train a machine learning model that can be utilized in determining additional and/or alternative parameters of an additional vehicle based on FMCW LIDAR data and/or based on other sensor data (e.g., non-FMCW LIDAR data, camera-based images, and/or other vision sensor data).

As one example of such an adaptation, at a variant of step 1202 the system can generate training instances that each include training instance input that includes phase coherent LIDAR data (FMCW LIDAR data, or other phase coherent LIDAR data), and that includes training instance output that includes an indication of velocity, acceleration, and/or heading, for additional vehicle(s), corresponding to the phase coherent LIDAR data of the training instance input. The additional vehicle(s) can include additional autonomous vehicle(s) and/or non-autonomous vehicle(s). The indication of the velocity, acceleration, and/or heading for a given additional vehicle, in the training instance output, can be based on output from corresponding sensor(s) of the additional vehicle. For example, the indication(s) can be determined based on monitoring of corresponding data from a CAN bus or other communication network of the additional vehicle, and/or based on monitoring of stand-alone sensors of the additional vehicle that are not in communication with the CAN bus and/or other integral communication network of the additional vehicle. Various techniques can be utilized to time-synchronize the velocity, acceleration, and/or heading (of the additional vehicle) with the phase coherent LIDAR data (of the autonomous vehicle), to enable assigning of a given velocity, given acceleration, and/or given heading to a corresponding phase coherent LIDAR data instance.

As one particular example of the adaptation, the training instance input of each training instance can include the entirety of phase coherent LIDAR data of an instance. For instance, each training instance input can be a corresponding range-Doppler image, a corresponding 3D point cloud (with velocity values and intensity values), or a corresponding time varying intermediate frequency (IF) waveform. The training instance output of each training instance in such a particular example can include, for example: bounding box(es) (or other bounding indication), if any, that each indicate a portion of the phase coherent LIDAR data that includes an additional vehicle; and indications of the velocity, acceleration, and/or heading for each of the bounding box(es) (if any).

As another particular example of the adaptation, the training instance input of each training example can include a subgroup of phase coherent LIDAR data of an instance, where the subgroup of phase coherent LIDAR data is selected based on determining that it corresponds to an additional vehicle (e.g., based on processing the phase coherent LIDAR data of the instance using a separate trained object detection and classification machine learning model). The training instance output of each training instance in such a particular example can include, for example, indications of the velocity, acceleration, and/or heading for the additional vehicle.

Accordingly, various implementations described herein can generate training instances that include training instance input that is based on sensor data of an autonomous vehicle, and that include training instance output that is based on sensor data of an additional vehicle, where the additional vehicle is captured at least in part by the sensor data of the autonomous vehicle. Training of a machine learning model based on such training instances can enable processing, using the machine learning model, of sensor data from an autonomous vehicle to predict one or more properties of an additional vehicle that is captured at least in part on the sensor data. It can be appreciated from the description herein that generating of such training instances can be performed automatically and without (or with minimal) human intervention. For example, supervised labels can be generated for the training instances based on sensor data of additional vehicle(s), obviating the need for human reviewers to provide such supervised labeling (and obviating consumption of various computational resources associated with such human labeling) and/or enabling accurate automated supervised labeling in situations where humans would be unable to generate labels based on review of training instance inputs.

What is claimed is:

1. A method comprising:

receiving, from a phase coherent Light Detection and Ranging (LIDAR) component of a vehicle, a group of LIDAR data points of a sensing cycle of the phase coherent LIDAR component, each of the LIDAR data points of the group indicating a corresponding instantaneous range and a corresponding instantaneous velocity for a corresponding point in an environment of the vehicle, and each of the LIDAR data points of the group being generated based on a corresponding sensing event of the phase coherent LIDAR component during the sensing cycle;

determining that a subgroup, of the LIDAR data points of the group, corresponds to a dynamic object in the environment;

based on determining that the subgroup corresponds to the dynamic object:

determining an instantaneous yaw parameter of the dynamic object based on a plurality of the corresponding instantaneous velocities of the LIDAR data points of the subgroup; and adapting autonomous control of the vehicle based on the determined instantaneous yaw parameter of the dynamic object.

2. The method of claim 1, wherein determining the instantaneous yaw parameter of the dynamic object based on the plurality of the corresponding instantaneous velocities of the LIDAR data points of the subgroup comprises:

determining the instantaneous yaw parameter based on the plurality of the corresponding instantaneous velocities of the LIDAR data points of the subgroup and based on a stored model for the dynamic object, the stored model describing geometric features of the dynamic object.

3. The method of claim 2, wherein the stored model is a three-dimensional model of the dynamic object.

4. The method of claim 2, further comprising:
selecting the stored model, from multiple candidate stored models, based on determining that sensor data, from the vehicle, corresponds most closely to the stored model.

5. The method of claim 4, wherein the sensor data comprises the group of LIDAR data points.

6. The method of claim 2, wherein determining the instantaneous yaw parameter based on the plurality of the corresponding instantaneous velocities of the LIDAR data points of the subgroup and based on the stored model for the dynamic object comprises:
determining a velocity differential based on comparison of a first set velocity magnitude and a second set velocity magnitude, wherein the first set velocity magnitude is based on a first set of the corresponding instantaneous velocities of the LIDAR data points of the subgroup, and wherein the second set velocity magnitude is based on a second set of the corresponding instantaneous velocities of the LIDAR data points of the subgroup; and
converting the velocity differential to the instantaneous yaw parameter based on the stored model for the dynamic object.

7. The method of claim 2, wherein determining the instantaneous yaw parameter based on the plurality of the corresponding instantaneous velocities of the LIDAR data points of the subgroup and based on the stored model for the dynamic object comprises:
simulating, using a simulator, movement of the stored model with application, to the stored model, of the corresponding instantaneous velocities of the LIDAR data points of the subgroup.

8. The method of claim 1, wherein determining the instantaneous yaw parameter of the dynamic object based on the corresponding instantaneous velocities of the plurality of the LIDAR data points of the subgroup comprises:
determining a first set of one or more of the plurality of LIDAR data points of the subgroup;
determining a second set of one or more of the plurality of LIDAR data points of the subgroup based on the second set being spatially offset from the first set; and
determining the instantaneous yaw parameter based on comparison of one or more of the corresponding instantaneous velocities of the first set to one or more of the corresponding instantaneous velocities of the second set.

9. The method of claim 1, wherein the instantaneous yaw parameter of the dynamic object is a lower bound yaw rate of the dynamic object, and further comprising determining an additional instantaneous yaw parameter of the dynamic object, that is an upper bound yaw rate, based on comparison of the first set to the second set.

10. The method of claim 1, wherein the instantaneous yaw parameter includes a yaw rate and a yaw direction, and wherein determining the instantaneous yaw parameter of the dynamic object based on the corresponding instantaneous velocities of the plurality of the LIDAR data points of the subgroup comprises:
processing the corresponding instantaneous velocities of the plurality of the LIDAR data points of the subgroup using a trained neural network model;
generating, based on processing of the LIDAR data points of the group using the trained neural network model, an output that indicates the yaw rate and the yaw direction; and
determining the yaw rate and the yaw direction based on the output.

11. The method of claim 1, wherein the instantaneous yaw parameter of the dynamic object is a velocity differential that is indicative of yaw rate, and wherein adapting autonomous control of the vehicle based on the determined instantaneous yaw parameter of the dynamic object comprises adapting a velocity of the vehicle and/or a direction of the vehicle based on the velocity differential exceeding a threshold.

12. The method of claim 1, wherein adapting autonomous control of the vehicle based on the determined instantaneous yaw parameter of the dynamic object comprises:
determining at least one candidate trajectory of the dynamic object based on the determined instantaneous yaw parameter; and
adapting autonomous control of the vehicle based on the at least one candidate trajectory.

13. The method of claim 12, wherein the dynamic object is an additional vehicle and wherein adapting autonomous control of the vehicle based on the at least one candidate trajectory comprises performing autonomous evasive steering.

14. The method of claim 1, wherein the LIDAR component is a LIDAR monopulse component and wherein the corresponding sensing events of the LIDAR component each comprise a first receiver sensing event at a first coherent receiver of the LIDAR monopulse component and a second receiver sensing event at a second coherent receiver of the LIDAR monopulse component, the first coherent receiver being positionally offset from the second coherent receiver.

15. The method of claim 14, wherein the LIDAR data points of the group are super-resolution LIDAR data points generated based on combining the first receiver sensing events and the second receiver sensing events.

16. A method comprising:
receiving, from a phase coherent Light Detection and Ranging (LIDAR) monopulse component of a vehicle, LIDAR data capturing an environment of the vehicle, the LIDAR data indicating, for each of a plurality of points in the environment of the vehicle, at least one corresponding instantaneous range and at least one corresponding instantaneous velocity based on a corresponding sensing event of the LIDAR monopulse component, the corresponding sensing events of the LIDAR component each comprising a first receiver sensing event at a first coherent receiver of the LIDAR monopulse component and a second receiver sensing event at a second coherent receiver of the LIDAR monopulse component, the first coherent receiver being positionally offset from the second coherent receiver;
determining that a subgroup of the LIDAR data corresponds to a dynamic object in the environment;
determining an instantaneous yaw rate of the dynamic object, the determining based on multiple corresponding instantaneous velocities indicated by the LIDAR data of the subgroup; and
providing the instantaneous yaw rate to one or both of: a planning subsystem of the vehicle and a control subsystem of the vehicle.

17. The method of claim 16, wherein the LIDAR data is super-resolution LIDAR data generated based on combining the first receiver sensing events and the second receiver sensing events.

18. The method of claim 17, wherein combining the first receiver sensing events and the second receiver sensing events comprises combining using one or both of: a frequency domain technique and a spatial domain technique.

19. The method of claim 16, wherein the dynamic object is an additional vehicle and wherein providing the instantaneous yaw rate to one or both of: the planning subsystem and the control subsystem comprises providing the instantaneous yaw rate to the planning subsystem.

20. An autonomous vehicle, comprising:
- a phase coherent Light Detection and Ranging (LIDAR) component;
- one or more processors executing stored computer instructions to:
  - receive, from the phase coherent LIDAR component, LIDAR data capturing an environment of the vehicle,
  - the LIDAR data indicating, for each of a plurality of points in the environment of the vehicle, at least one corresponding instantaneous range and at least one corresponding instantaneous velocity based on a corresponding sensing event of the phase coherent LIDAR component;
  - determine, based on multiple of the corresponding instantaneous velocities indicated by the LIDAR data, an instantaneous yaw parameter of a dynamic object in the environment of the vehicle; and
  - adapt autonomous control of the vehicle based on the determined instantaneous yaw parameter of the dynamic object.

\* \* \* \* \*